(12) United States Patent
Wentker et al.

(10) Patent No.: US 10,387,868 B2
(45) Date of Patent: Aug. 20, 2019

(54) MOBILE PAYMENT MANAGEMENT

(71) Applicant: Visa U.S.A. Inc., San Francisco, CA (US)

(72) Inventors: David Wentker, San Francisco, CA (US); Erick Wong, Menlo Park, CA (US); Doug Diebert, Alameda, CA (US); Gavin Shenker, Los Angeles, CA (US)

(73) Assignee: VISA U.S.A. INC., San Francisco, CA (US)

( * ) Notice: Subject to any disclaimer, the term of this patent is extended or adjusted under 35 U.S.C. 154(b) by 18 days.

(21) Appl. No.: 14/543,608

(22) Filed: Nov. 17, 2014

(65) Prior Publication Data
US 2015/0066670 A1 Mar. 5, 2015

Related U.S. Application Data

(63) Continuation of application No. 11/971,715, filed on Jan. 9, 2008, now Pat. No. 8,923,827.
(Continued)

(51) Int. Cl.
*G06Q 20/32* (2012.01)
*G06Q 20/20* (2012.01)
(Continued)

(52) U.S. Cl.
CPC ......... *G06Q 20/3229* (2013.01); *G06Q 20/10* (2013.01); *G06Q 20/20* (2013.01);
(Continued)

(58) Field of Classification Search
CPC ...... G06Q 20/32; G06Q 20/10; G06Q 20/322; G06Q 20/20; G06Q 40/00; G06Q 20/3221; G06Q 20/3278; G06Q 30/0224; G06Q 20/202; G06Q 20/3229; G06Q 20/204; H04L 12/66; H04W 88/02; H04W 4/80
See application file for complete search history.

(56) References Cited

U.S. PATENT DOCUMENTS 1,525,107 A 2/1925 Spencer
1,651,640 A 12/1927 Spencer
(Continued)

FOREIGN PATENT DOCUMENTS

BR 200400046 A 9/2005
EP 954141 A1 11/1999
(Continued)

OTHER PUBLICATIONS

Nordlund, Sirpa. "Secure Over-The-Air Services in NFC Ecosystems." retrieved from the internet at: http://www.nfc-research.at/fileadmincongress/pdf/05—Venyon—Sirpa—Nordlund.pdf 26 (2007).*
(Continued)

*Primary Examiner* — Asfand M Sheikh
(74) *Attorney, Agent, or Firm* — Kilpatrick Townsend & Stockton LLP

(57) ABSTRACT

A method for managing mobile payments in a mobile phone. The method includes receiving data associated with a plurality of issuer specific payment services at a mobile phone, selecting one of the issuer specific payment services, and conducting a transaction using the phone.

21 Claims, 9 Drawing Sheets

Related U.S. Application Data

(60) Provisional application No. 60/884,212, filed on Jan. 9, 2007, provisional application No. 60/884,290, filed on Jan. 10, 2007.

(51) Int. Cl.
    *G06Q 20/10*         (2012.01)
    *G06Q 30/02*         (2012.01)
    *G06Q 40/00*         (2012.01)
    *H04L 12/66*         (2006.01)
    *H04W 4/80*          (2018.01)
    *H04W 88/02*        (2009.01)

(52) U.S. Cl.
    CPC ......... *G06Q 20/202* (2013.01); *G06Q 20/204* (2013.01); *G06Q 20/32* (2013.01); *G06Q 20/322* (2013.01); *G06Q 20/3221* (2013.01); *G06Q 20/3278* (2013.01); *G06Q 30/0224* (2013.01); *G06Q 40/00* (2013.01); *H04L 12/66* (2013.01); *H04W 4/80* (2018.02); *H04W 88/02* (2013.01)

(56) References Cited

U.S. PATENT DOCUMENTS

| | | |
|---|---|---|
| 1,899,533 A | 2/1933 | Spencer |
| 2,071,239 A | 2/1937 | Spencer et al. |
| 2,071,240 A | 2/1937 | Spencer et al. |
| 3,140,475 A | 7/1964 | Spencer et al. |
| 3,211,004 A | 10/1965 | Spencer |
| 3,303,867 A | 2/1967 | Hill et al. |
| 3,312,768 A | 4/1967 | Spencer |
| 3,377,924 A | 4/1968 | Spencer et al. |
| 3,443,080 A | 5/1969 | Spencer |
| 3,505,511 A | 4/1970 | Campano et al. |
| 3,592,041 A | 7/1971 | Spencer |
| 3,628,329 A | 12/1971 | Spencer |
| 3,689,887 A | 9/1972 | La Falce |
| 3,708,784 A | 1/1973 | Spencer |
| 3,764,998 A | 10/1973 | Spencer |
| 3,967,188 A | 6/1976 | Spencer |
| 4,216,672 A | 8/1980 | Henry et al. |
| 4,438,778 A | 3/1984 | Spencer |
| 4,483,530 A | 11/1984 | Spencer et al. |
| 4,514,799 A | 4/1985 | Spencer et al. |
| 4,528,493 A | 7/1985 | Spencer et al. |
| 4,559,486 A | 12/1985 | Spencer et al. |
| 4,613,904 A | 9/1986 | Lurie |
| 4,625,276 A | 11/1986 | Benton et al. |
| 4,674,041 A | 6/1987 | Lemon et al. |
| 4,710,095 A | 12/1987 | Freberg et al. |
| 4,860,352 A | 8/1989 | Laurance et al. |
| 4,884,242 A | 11/1989 | Lacy et al. |
| 5,036,461 A | 7/1991 | Elliott et al. |
| 5,078,173 A | 1/1992 | Spencer et al. |
| 5,220,501 A | 6/1993 | Lawlor et al. |
| 5,221,838 A | 6/1993 | Gutman et al. |
| 5,261,451 A | 11/1993 | Spencer |
| 5,276,311 A | 1/1994 | Hennige |
| 5,305,196 A | 4/1994 | Deaton et al. |
| 5,311,594 A | 5/1994 | Penzias |
| 5,327,508 A | 7/1994 | Deaton et al. |
| 5,329,589 A | 7/1994 | Fraser et al. |
| 5,353,218 A | 10/1994 | DeLapa et al. |
| 5,388,165 A | 2/1995 | Deaton et al. |
| RE34,915 E | 4/1995 | Nichtberger et al. |
| 5,420,606 A | 5/1995 | Begum et al. |
| 5,423,042 A | 6/1995 | Jalili et al. |
| 5,430,644 A | 7/1995 | Deaton et al. |
| 5,448,471 A | 9/1995 | Deaton et al. |
| 5,462,086 A | 10/1995 | Taylor et al. |
| 5,465,206 A | 11/1995 | Hilt et al. |
| 5,477,038 A | 12/1995 | Levine et al. |
| 5,483,444 A | 1/1996 | Heintzeman et al. |
| 5,500,513 A | 3/1996 | Langhans et al. |
| 5,502,636 A | 3/1996 | Clarke |
| 5,518,503 A | 5/1996 | Rooney et al. |
| 5,539,450 A | 7/1996 | Handelman |
| 5,564,073 A | 10/1996 | Takahisa |
| 5,565,857 A | 10/1996 | Lee |
| 5,577,266 A | 11/1996 | Takahisa et al. |
| 5,579,537 A | 11/1996 | Takahisa |
| 5,590,038 A | 12/1996 | Pitroda |
| 5,591,949 A | 1/1997 | Bernstein |
| 5,592,560 A | 1/1997 | Deaton et al. |
| 5,604,921 A | 2/1997 | Alanara |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,650,604 A | 7/1997 | Marcous et al. |
| 5,652,786 A | 7/1997 | Rogers |
| 5,659,165 A | 8/1997 | Jennings et al. |
| 5,659,469 A | 8/1997 | Deaton et al. |
| 5,675,662 A | 10/1997 | Deaton et al. |
| 5,687,322 A | 11/1997 | Deaton et al. |
| 5,710,886 A | 1/1998 | Christensen et al. |
| 5,717,866 A | 2/1998 | Naftzger |
| 5,729,460 A | 3/1998 | Plett et al. |
| 5,761,648 A | 6/1998 | Golden et al. |
| 5,791,991 A | 8/1998 | Small |
| 5,793,972 A | 8/1998 | Shane |
| 5,794,210 A | 8/1998 | Goldhaber et al. |
| 5,806,044 A | 9/1998 | Powell |
| 5,815,657 A | 9/1998 | Williams et al. |
| 5,822,735 A | 10/1998 | De Lapa et al. |
| 5,826,241 A | 10/1998 | Stein et al. |
| 5,855,007 A | 12/1998 | Jovicic et al. |
| 5,859,419 A | 1/1999 | Wynn |
| 5,870,030 A | 2/1999 | DeLuca et al. |
| 5,884,271 A | 3/1999 | Pitroda |
| 5,884,277 A | 3/1999 | Khosla |
| 5,905,246 A | 5/1999 | Fajkowski |
| 5,907,830 A | 5/1999 | Engel et al. |
| 5,915,023 A | 6/1999 | Bernstein |
| 5,924,080 A | 7/1999 | Johnson |
| 5,937,396 A | 8/1999 | Konya |
| 5,945,652 A | 8/1999 | Ohki et al. |
| 5,949,044 A | 9/1999 | Walker et al. |
| 5,952,641 A | 9/1999 | Korshun |
| 5,959,577 A | 9/1999 | Fan et al. |
| 5,974,399 A | 10/1999 | Giuliani et al. |
| 5,986,565 A | 11/1999 | Isaka |
| 5,987,438 A | 11/1999 | Nakano et al. |
| 5,991,410 A | 11/1999 | Albert et al. |
| 5,991,748 A | 11/1999 | Taskett |
| 5,991,749 A | 11/1999 | Morrill |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,016,476 A | 1/2000 | Maes et al. |
| 6,016,956 A | 1/2000 | Takami et al. |
| 6,018,718 A | 1/2000 | Walker et al. |
| 6,018,724 A | 1/2000 | Arent |
| 6,023,682 A | 2/2000 | Checchio |
| 6,035,280 A | 3/2000 | Christensen |
| 6,038,552 A | 3/2000 | Fleischl et al. |
| 6,041,309 A | 3/2000 | Laor |
| 6,041,314 A | 3/2000 | Davis |
| 6,049,778 A | 4/2000 | Walker et al. |
| 6,058,382 A | 5/2000 | Kasai et al. |
| 6,062,991 A | 5/2000 | Moriarty et al. |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| 6,078,806 A | 6/2000 | Heinonen et al. |

(56) References Cited

U.S. PATENT DOCUMENTS

| | | |
|---|---|---|
| 6,088,683 A | 7/2000 | Jalili |
| 6,112,984 A | 9/2000 | Snavely |
| 6,128,599 A | 10/2000 | Walker et al. |
| 6,131,811 A | 10/2000 | Gangi |
| 6,169,890 B1 | 1/2001 | Vatanen |
| 6,169,974 B1 | 1/2001 | Baumgartner et al. |
| 6,185,290 B1 | 2/2001 | Shaffer et al. |
| 6,185,541 B1 | 2/2001 | Scroggie et al. |
| 6,209,104 B1 | 3/2001 | Jalili |
| 6,213,391 B1 | 4/2001 | Lewis |
| 6,237,145 B1 | 5/2001 | Narasimhan et al. |
| 6,247,129 B1 | 6/2001 | Keathley et al. |
| 6,250,557 B1 | 6/2001 | Forslund et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,293,462 B1 | 9/2001 | Gangi |
| 6,295,522 B1 | 9/2001 | Boesch et al. |
| 6,307,958 B1 | 10/2001 | Deaton et al. |
| 6,317,835 B1 | 11/2001 | Bilger et al. |
| 6,318,631 B1 | 11/2001 | Halperin |
| 6,321,208 B1 | 11/2001 | Barnett et al. |
| 6,330,543 B1 | 12/2001 | Kepecs |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,340,116 B1 | 1/2002 | Cecil et al. |
| 6,351,735 B1 | 2/2002 | Deaton et al. |
| 6,356,752 B1 | 3/2002 | Griffith |
| 6,366,893 B2 | 4/2002 | Hannula et al. |
| 6,377,935 B1 | 4/2002 | Deaton et al. |
| 6,381,324 B1 | 4/2002 | Shaffer et al. |
| 6,394,343 B1 | 5/2002 | Berg et al. |
| 6,418,326 B1 | 7/2002 | Heinonen et al. |
| 6,418,420 B1 | 7/2002 | DiGiorgio et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,439,456 B1 | 8/2002 | Bansal et al. |
| 6,442,448 B1 | 8/2002 | Finley et al. |
| 6,470,181 B1 | 10/2002 | Maxwell |
| 6,484,146 B2 | 11/2002 | Day et al. |
| 6,488,203 B1 | 12/2002 | Stoutenberg et al. |
| 6,502,078 B2 | 12/2002 | Kasai et al. |
| 6,502,747 B1 | 1/2003 | Stoutenberg et al. |
| 6,505,046 B1 | 1/2003 | Baker |
| 6,516,302 B1 | 2/2003 | Deaton et al. |
| 6,519,329 B1 | 2/2003 | Hjelmvik |
| 6,535,726 B1 | 3/2003 | Johnson |
| 6,538,261 B1 | 3/2003 | McConnel et al. |
| 6,560,581 B1 | 5/2003 | Fox et al. |
| 6,577,274 B1 | 6/2003 | Bajikar |
| 6,584,309 B1 | 6/2003 | Whigham |
| 6,587,835 B1 | 7/2003 | Treyz et al. |
| 6,594,376 B2 | 7/2003 | Hoffman et al. |
| 6,601,759 B2 | 8/2003 | Fife et al. |
| 6,609,104 B1 | 8/2003 | Deaton et al. |
| 6,609,113 B1 | 8/2003 | O'Leary et al. |
| 6,611,811 B1 | 8/2003 | Deaton et al. |
| 6,612,487 B2 | 9/2003 | Tidball et al. |
| 6,616,035 B2 | 9/2003 | Ehrensvard et al. |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,736,322 B2 | 5/2004 | Gobburu et al. |
| 6,745,936 B1 | 6/2004 | Movalli et al. |
| 6,754,468 B1 | 6/2004 | Sieben et al. |
| 6,761,309 B2 | 7/2004 | Stoutenberg et al. |
| 6,763,094 B2 | 7/2004 | Conn et al. |
| 6,763,336 B1 | 7/2004 | Kolls |
| 6,769,605 B1 | 8/2004 | Magness |
| 6,771,981 B1 | 8/2004 | Zalewski et al. |
| 6,775,539 B2 | 8/2004 | Deshpande |
| 6,784,468 B2 | 8/2004 | Honda |
| 6,810,234 B1 | 10/2004 | Rasanen et al. |
| 6,814,282 B2 | 11/2004 | Seifert et al. |
| 6,816,721 B1 | 11/2004 | Rudisill |
| 6,829,467 B2 | 12/2004 | Ochiai |
| 6,837,425 B2 | 1/2005 | Gauthier et al. |
| 6,873,974 B1 | 3/2005 | Schutzer |
| 6,901,251 B1 | 5/2005 | Kiesslling et al. |
| 6,912,398 B1 | 6/2005 | Domnitz |
| 6,920,611 B1 | 7/2005 | Spaeth et al. |
| 6,925,439 B1 | 8/2005 | Pitroda |
| 6,934,689 B1 | 8/2005 | Ritter et al. |
| 6,934,849 B2 | 8/2005 | Kramer et al. |
| 6,959,202 B2 | 10/2005 | Heinonen et al. |
| 6,975,852 B1 | 12/2005 | Sofer et al. |
| 6,983,882 B2 | 1/2006 | Cassone |
| 6,988,657 B1 | 1/2006 | Singer et al. |
| 6,990,472 B2 | 1/2006 | Rosenhaft et al. |
| 6,994,251 B2 | 2/2006 | Hansen et al. |
| 7,003,493 B2 | 2/2006 | Weichert et al. |
| 7,003,495 B2 | 2/2006 | Burger et al. |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,031,939 B1 | 4/2006 | Gallagher et al. |
| 7,039,389 B2 | 5/2006 | Johnson, Jr. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,069,248 B2 | 6/2006 | Huber |
| 7,070,094 B2 | 7/2006 | Stoutenberg et al. |
| 7,076,329 B1 | 7/2006 | Kolls |
| 7,079,008 B2 | 7/2006 | Castle et al. |
| 7,085,556 B2 | 8/2006 | Offer |
| 7,092,916 B2 | 8/2006 | Diveley et al. |
| 7,104,446 B2 | 9/2006 | Bortolin et al. |
| 7,110,792 B2 | 9/2006 | Rosenberg |
| 7,110,954 B2 | 9/2006 | Yung et al. |
| 7,120,608 B1 | 10/2006 | Gallagher et al. |
| 7,121,456 B2 | 10/2006 | Spaeth et al. |
| 7,124,937 B2 | 10/2006 | Myers et al. |
| 7,127,236 B2 | 10/2006 | Khan et al. |
| 7,128,274 B2 | 10/2006 | Kelley et al. |
| 7,150,393 B1 | 12/2006 | Drummond et al. |
| 7,152,780 B2 | 12/2006 | Gauthier et al. |
| 7,167,711 B1 | 1/2007 | Dennis |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,225,156 B2 | 5/2007 | Fisher et al. |
| 7,231,372 B1 | 6/2007 | Prange et al. |
| 7,243,853 B1 | 7/2007 | Levy et al. |
| 7,280,981 B2 | 10/2007 | Huang et al. |
| 7,286,818 B2 | 10/2007 | Rosenberg |
| 7,314,167 B1 | 1/2008 | Kiliccote |
| 7,331,518 B2 | 2/2008 | Rable |
| 7,336,973 B2 | 2/2008 | Goldthwaite et al. |
| 7,349,871 B2 | 3/2008 | Labrou et al. |
| 7,350,230 B2 | 3/2008 | Forrest |
| 7,350,702 B2 | 4/2008 | Bortolin et al. |
| 7,353,991 B2 | 4/2008 | Esplin et al. |
| 7,356,516 B2 | 4/2008 | Richey et al. |
| 7,364,071 B2 | 4/2008 | Esplin et al. |
| 7,373,329 B2 | 5/2008 | Gallagher et al. |
| 7,395,241 B1 | 7/2008 | Cook et al. |
| 7,447,663 B1 | 11/2008 | Barker et al. |
| 7,451,114 B1 | 11/2008 | Matsuda et al. |
| 7,454,232 B2 | 11/2008 | Abhuamdeh |
| 7,730,169 B2 | 6/2010 | Greschler et al. |
| 7,835,960 B2 | 11/2010 | Breck et al. |
| 8,332,272 B2 | 12/2012 | Fisher |
| 8,712,407 B1* | 4/2014 | Cope .................. H04W 4/00 455/426.1 |
| 2001/0001877 A1 | 5/2001 | French et al. |
| 2001/0005840 A1 | 6/2001 | Verkama |
| 2001/0032150 A1 | 10/2001 | Terashima |

(56) References Cited

U.S. PATENT DOCUMENTS

| | | |
|---|---|---|
| 2001/0045454 A1 | 11/2001 | Gangi |
| 2001/0047335 A1 | 11/2001 | Arndt et al. |
| 2001/0049636 A1 | 12/2001 | Hudda et al. |
| 2001/0051531 A1 | 12/2001 | Singhal et al. |
| 2001/0051920 A1 | 12/2001 | Joao |
| 2001/0051931 A1 | 12/2001 | Schweitzer |
| 2002/0035539 A1 | 3/2002 | O'Connell |
| 2002/0040928 A1 | 4/2002 | Jalili et al. |
| 2002/0045468 A1 | 4/2002 | Jalili |
| 2002/0049804 A1 | 4/2002 | Rodriguez et al. |
| 2002/0052841 A1 | 5/2002 | Guthrie et al. |
| 2002/0065713 A1 | 5/2002 | Awada et al. |
| 2002/0065774 A1 | 5/2002 | Young et al. |
| 2002/0073178 A1 | 6/2002 | Jalili |
| 2002/0091569 A1 | 7/2002 | Kitaura et al. |
| 2002/0128903 A1 | 9/2002 | Kernahan |
| 2002/0128967 A1 | 9/2002 | Meyer et al. |
| 2002/0147658 A1 | 10/2002 | Kwan |
| 2002/0147685 A1 | 10/2002 | Kwan |
| 2002/0152168 A1 | 10/2002 | Neofytides et al. |
| 2002/0155989 A1 | 10/2002 | Efimov et al. |
| 2002/0161701 A1 | 10/2002 | Warmack |
| 2002/0165775 A1 | 11/2002 | Tagseth et al. |
| 2002/0169719 A1 | 11/2002 | Dively et al. |
| 2002/0174016 A1 | 11/2002 | Cuervo |
| 2002/0198777 A1 | 12/2002 | Yuasa |
| 2003/0004808 A1 | 1/2003 | Elhaoussine et al. |
| 2003/0026429 A1 | 2/2003 | Hammersmith |
| 2003/0035233 A1 | 2/2003 | Jalili |
| 2003/0055785 A1 | 3/2003 | Lahiri |
| 2003/0058261 A1 | 3/2003 | Challa et al. |
| 2003/0061162 A1 | 3/2003 | Matthews |
| 2003/0105710 A1 | 6/2003 | Barbara et al. |
| 2003/0115126 A1 | 6/2003 | Pitroda |
| 2003/0120593 A1 | 6/2003 | Bansal et al. |
| 2003/0126078 A1 | 7/2003 | Vihinen |
| 2003/0130940 A1 | 7/2003 | Hansen et al. |
| 2003/0144907 A1 | 7/2003 | Cohen et al. |
| 2003/0151495 A1 | 8/2003 | Ludvigsen |
| 2003/0172040 A1 | 9/2003 | Kemper et al. |
| 2003/0208406 A1 | 11/2003 | Okamoto et al. |
| 2003/0212595 A1 | 11/2003 | Antonucci |
| 2003/0233292 A1 | 12/2003 | Richey et al. |
| 2004/0002902 A1 | 1/2004 | Muehlhaeuser |
| 2004/0019522 A1 | 1/2004 | Bortolin et al. |
| 2004/0019564 A1 | 1/2004 | Goldthwaite et al. |
| 2004/0030601 A1 | 2/2004 | Pond et al. |
| 2004/0030607 A1 | 2/2004 | Gibson |
| 2004/0039693 A1 | 2/2004 | Nauman et al. |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0054592 A1 | 3/2004 | Hernblad |
| 2004/0059672 A1 | 3/2004 | Baig et al. |
| 2004/0078327 A1 | 4/2004 | Frazier et al. |
| 2004/0087339 A1 | 5/2004 | Goldthwaite et al. |
| 2004/0093281 A1 | 5/2004 | Silverstein et al. |
| 2004/0098515 A1 | 5/2004 | Rezvani et al. |
| 2004/0098628 A1 | 5/2004 | Butler |
| 2004/0103063 A1 | 5/2004 | Takayama et al. |
| 2004/0107144 A1 | 6/2004 | Short |
| 2004/0117254 A1 | 6/2004 | Nemirofsky et al. |
| 2004/0122685 A1 | 6/2004 | Bunce |
| 2004/0122768 A1 | 6/2004 | Creamer et al. |
| 2004/0124966 A1 | 7/2004 | Forrest |
| 2004/0127256 A1 | 7/2004 | Goldthwaite et al. |
| 2004/0139013 A1 | 7/2004 | Barbier et al. |
| 2004/0139021 A1 | 7/2004 | Reed et al. |
| 2004/0143550 A1 | 7/2004 | Creamer et al. |
| 2004/0148224 A1 | 7/2004 | Gauthier et al. |
| 2004/0148254 A1 | 7/2004 | Hauser |
| 2004/0153715 A1 | 8/2004 | Spaeth et al. |
| 2004/0159700 A1 | 8/2004 | Khan et al. |
| 2004/0176134 A1 | 9/2004 | Goldthwaite et al. |
| 2004/0181463 A1 | 9/2004 | Goldthwaite et al. |
| 2004/0188515 A1 | 9/2004 | Jimenez |
| 2004/0216053 A1 | 10/2004 | Sponheim et al. |
| 2004/0220964 A1 | 11/2004 | Shiftan et al. |
| 2004/0225718 A1 | 11/2004 | Heinzel et al. |
| 2004/0230489 A1 | 11/2004 | Goldthwaite et al. |
| 2004/0236632 A1 | 11/2004 | Maritzen et al. |
| 2004/0254848 A1 | 12/2004 | Golan et al. |
| 2004/0259579 A1 | 12/2004 | Robles et al. |
| 2005/0021456 A1 | 1/2005 | Steele et al. |
| 2005/0027602 A1 | 2/2005 | Haddad |
| 2005/0029344 A1 | 2/2005 | Davis |
| 2005/0035847 A1 | 2/2005 | Bonalle et al. |
| 2005/0036611 A1 | 2/2005 | Seaton et al. |
| 2005/0044014 A1 | 2/2005 | Tilis et al. |
| 2005/0044042 A1 | 2/2005 | Mendiola et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0080697 A1 | 4/2005 | Foss et al. |
| 2005/0086171 A1 | 4/2005 | Abe et al. |
| 2005/0102234 A1 | 5/2005 | Devine |
| 2005/0109838 A1 | 5/2005 | Linlor |
| 2005/0121506 A1 | 6/2005 | Gauthier et al. |
| 2005/0125558 A1 | 6/2005 | Holden et al. |
| 2005/0131967 A1 | 6/2005 | Holden et al. |
| 2005/0149455 A1 | 7/2005 | Bruesewitz et al. |
| 2005/0154649 A1 | 7/2005 | Jalili |
| 2005/0165684 A1 | 7/2005 | Jensen et al. |
| 2005/0171909 A1 | 8/2005 | Woo et al. |
| 2005/0177517 A1 | 8/2005 | Leung et al. |
| 2005/0187873 A1 | 8/2005 | Labrou et al. |
| 2005/0199709 A1 | 9/2005 | Linlor |
| 2005/0199714 A1 | 9/2005 | Brandt et al. |
| 2005/0209958 A1 | 9/2005 | Michelsen et al. |
| 2005/0219061 A1 | 10/2005 | Lai et al. |
| 2005/0222933 A1 | 10/2005 | Wesby |
| 2005/0222949 A1 | 10/2005 | Inotay et al. |
| 2005/0222961 A1 | 10/2005 | Staib et al. |
| 2005/0254650 A1 | 11/2005 | Sakurai et al. |
| 2005/0256802 A1 | 11/2005 | Ammermann et al. |
| 2005/0269402 A1 | 12/2005 | Spitzer et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0000900 A1 | 1/2006 | Fernandes et al. |
| 2006/0006223 A1 | 1/2006 | Harris |
| 2006/0016878 A1 | 1/2006 | Singer et al. |
| 2006/0016880 A1 | 1/2006 | Singer et al. |
| 2006/0031161 A1 | 2/2006 | D'Agostino |
| 2006/0053056 A1 | 3/2006 | Alspach-Goss et al. |
| 2006/0059110 A1 | 3/2006 | Madhok et al. |
| 2006/0064380 A1 | 3/2006 | Zukerman |
| 2006/0080243 A1 | 4/2006 | Kemper et al. |
| 2006/0085260 A1 | 4/2006 | Yamagishi |
| 2006/0085361 A1 | 4/2006 | Hoerle et al. |
| 2006/0111967 A1 | 5/2006 | Forbes |
| 2006/0117076 A1 | 6/2006 | Spencer et al. |
| 2006/0149529 A1 | 7/2006 | Nguyen et al. |
| 2006/0155644 A1 | 7/2006 | Reid et al. |
| 2006/0163345 A1 | 7/2006 | Myers et al. |
| 2006/0165060 A1 | 7/2006 | Dua |
| 2006/0178957 A1 | 8/2006 | LeClaire |
| 2006/0179007 A1 | 8/2006 | Davis |
| 2006/0190351 A1 | 8/2006 | Dennis |
| 2006/0191996 A1 | 8/2006 | Drummond et al. |
| 2006/0206376 A1 | 9/2006 | Gibbs et al. |
| 2006/0206425 A1 | 9/2006 | Sharma |
| 2006/0213968 A1 | 9/2006 | Guest et al. |
| 2006/0224449 A1 | 10/2006 | Byerley et al. |

(56) References Cited

U.S. PATENT DOCUMENTS

| | | |
|---|---|---|
| 2006/0224470 A1 | 10/2006 | Ruano et al. |
| 2006/0224887 A1* | 10/2006 | Vesikivi .................. G06F 21/35 713/166 |
| 2006/0229998 A1 | 10/2006 | Harrison et al. |
| 2006/0231611 A1 | 10/2006 | Chakiris et al. |
| 2006/0235931 A1* | 10/2006 | Ruthe .................. H04L 51/066 709/206 |
| 2006/0248007 A1 | 11/2006 | Hofer et al. |
| 2006/0253335 A1 | 11/2006 | Keena et al. |
| 2006/0253339 A1 | 11/2006 | Singh et al. |
| 2006/0253389 A1 | 11/2006 | Hagale et al. |
| 2006/0253390 A1 | 11/2006 | McCarthy et al. |
| 2006/0265325 A1 | 11/2006 | Fajardo |
| 2006/0282382 A1 | 12/2006 | Balasubramanian et al. |
| 2006/0287964 A1 | 12/2006 | Brown et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0011099 A1 | 1/2007 | Sheehan |
| 2007/0011104 A1 | 1/2007 | Leger et al. |
| 2007/0012764 A1 | 1/2007 | Bortolin et al. |
| 2007/0017970 A1 | 1/2007 | Gauthier et al. |
| 2007/0022058 A1 | 1/2007 | Labrou et al. |
| 2007/0027925 A1 | 2/2007 | Spencer et al. |
| 2007/0034679 A1 | 2/2007 | Gauthier et al. |
| 2007/0045401 A1 | 3/2007 | Sturm |
| 2007/0053518 A1 | 3/2007 | Tompkins et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057043 A1 | 3/2007 | de la Garza Ortega et al. |
| 2007/0057051 A1 | 3/2007 | Bortolin et al. |
| 2007/0083424 A1 | 4/2007 | Lang et al. |
| 2007/0083465 A1 | 4/2007 | Ciurea et al. |
| 2007/0094132 A1 | 4/2007 | Waterson et al. |
| 2007/0094150 A1 | 4/2007 | Yuen et al. |
| 2007/0100691 A1 | 5/2007 | Patterson |
| 2007/0107044 A1 | 5/2007 | Yuen et al. |
| 2007/0125842 A1 | 6/2007 | Antoo et al. |
| 2007/0156517 A1 | 7/2007 | Kaplan et al. |
| 2007/0156579 A1 | 7/2007 | Manesh |
| 2007/0168228 A1 | 7/2007 | Lawless |
| 2007/0175978 A1 | 8/2007 | Stambaugh |
| 2007/0194110 A1 | 8/2007 | Esplin et al. |
| 2007/0197261 A1 | 8/2007 | Humbel |
| 2007/0203850 A1 | 8/2007 | Singh et al. |
| 2007/0205270 A1 | 9/2007 | Kemper et al. |
| 2007/0230371 A1 | 10/2007 | Tumminaro |
| 2007/0233615 A1 | 10/2007 | Tumminaro |
| 2007/0235539 A1 | 10/2007 | Sevanto et al. |
| 2007/0238450 A1 | 10/2007 | Hogberg |
| 2007/0244811 A1 | 10/2007 | Tumminaro |
| 2007/0249420 A1 | 10/2007 | Randall |
| 2007/0255620 A1 | 11/2007 | Tumminaro |
| 2007/0255652 A1 | 11/2007 | Tumminaro |
| 2007/0255653 A1 | 11/2007 | Tumminaro et al. |
| 2007/0255662 A1 | 11/2007 | Tumminaro |
| 2007/0262134 A1 | 11/2007 | Humphrey et al. |
| 2007/0262139 A1 | 11/2007 | Fiebiger et al. |
| 2007/0265006 A1 | 11/2007 | Washok et al. |
| 2007/0266130 A1 | 11/2007 | Mazur et al. |
| 2007/0266131 A1 | 11/2007 | Mazur et al. |
| 2007/0276764 A1 | 11/2007 | Mann et al. |
| 2008/0003977 A1 | 1/2008 | Chakiris et al. |
| 2008/0005037 A1 | 1/2008 | Hammad et al. |
| 2008/0006685 A1 | 1/2008 | Rackley, III et al. |
| 2008/0010190 A1 | 1/2008 | Rackley, III et al. |
| 2008/0010191 A1* | 1/2008 | Rackley, III .......... G06Q 20/042 705/39 |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0011825 A1 | 1/2008 | Giordano et al. |
| 2008/0027815 A1 | 1/2008 | Johnson et al. |
| 2008/0032741 A1 | 2/2008 | Tumminaro |
| 2008/0033877 A1 | 2/2008 | Blair et al. |
| 2008/0034396 A1 | 2/2008 | Lev |
| 2008/0040265 A1 | 2/2008 | Rackley, III et al. |
| 2008/0041936 A1 | 2/2008 | Vawter |
| 2008/0046362 A1 | 2/2008 | Easterly |
| 2008/0046366 A1 | 2/2008 | Bemmel et al. |
| 2008/0046747 A1 | 2/2008 | Brown et al. |
| 2008/0052091 A1 | 2/2008 | Vawter |
| 2008/0058014 A1 | 3/2008 | Khan et al. |
| 2008/0059375 A1 | 3/2008 | Abifaker |
| 2008/0077527 A1 | 3/2008 | Choe et al. |
| 2008/0085698 A1 | 4/2008 | Gamm |
| 2008/0114699 A1 | 5/2008 | Yuan et al. |
| 2008/0120231 A1 | 5/2008 | Megwa |
| 2008/0154727 A1 | 6/2008 | Carlson et al. |
| 2008/0154735 A1 | 6/2008 | Carlson |
| 2008/0154772 A1 | 6/2008 | Carlson et al. |
| 2008/0163257 A1 | 7/2008 | Carlson |
| 2008/0167000 A1 | 7/2008 | Wentker et al. |
| 2008/0167017 A1 | 7/2008 | Wentker et al. |
| 2008/0167991 A1 | 7/2008 | Carlson et al. |
| 2008/0172317 A1 | 7/2008 | Diebert et al. |
| 2008/0183480 A1 | 7/2008 | Carlson et al. |
| 2008/0201226 A1 | 8/2008 | Carlson et al. |
| 2009/0098825 A1 | 4/2009 | Huomo et al. |
| 2009/0106160 A1 | 4/2009 | Skowronek |
| 2011/0078081 A1* | 3/2011 | Pirzadeh ................ G06Q 20/20 705/44 |
| 2011/0239304 A1* | 9/2011 | Saarisalo ................ G06F 21/57 726/26 |
| 2013/0217459 A1 | 8/2013 | Luciano, Jr. et al. |

FOREIGN PATENT DOCUMENTS

| | | |
|---|---|---|
| GB | 2312398 A | 10/1997 |
| GB | 2396472 A | 6/2004 |
| WO | 1999/051038 | 7/1999 |
| WO | 2000/002407 A2 | 1/2000 |
| WO | 2000/003328 | 1/2000 |
| WO | 2000/46769 A1 | 8/2000 |
| WO | 2002/019648 A2 | 3/2002 |

OTHER PUBLICATIONS

Benyo, B., et al. "NFC applications and business model of the ecosystem." 2007 16th IST Mobile and Wireless Communications Summit. IEEE, 2007.*

Kageyama, Yuri; "Japanese carrier unveils mobile-phone wallet," [online], [retrieved from the on Feb. 5, 2007]. Retrieved from the internet <URL: http://usatoday.printthis.clickability.com/pt/cpt?action=cpt&title=USATODAY.com+-+Jap . . . >, 3 pages.

Korousic, Bojan et al.; "3rd Year Project Report EZ-Ca$h: Feasibility Project," 2003, *Electronics Engineering Technology—Telecommunications Systems, Conestoga College*, 33 pages.

Subramanian, Hemang C.; "SIM Access Profile: Electronic currency using SIM Access Profile," [online] 2003. [Retrieved on Jan. 7, 2007]. Retrieved from the internet <URL: http:/www-128.ibm.com/developerworks/wireless/library/wi-simacc/>, 6 pages.

"Ubiquitous Commerce"; [online]. [Retrieved on Jan. 24, 2007] Retrieved from the internet <URL: http://www.accenture.com/Global/Services/Accenture_Technology_Labs/R_and_I/Mobile . . . > 2 pages.

"M Pay: Frequently Asked Questions," [online]. [Retrieved on Jan. 24, 2007]. Retrieved from the internet <URL: http://www.m-pay.com/index.php?id=18> , 5 pages.

"GSMVend Technical Manual"; [online]. [Retrieved on Mar. 16, 2007]. Retrieved from the internet <URL: http://www.bonusdata.net/IntusJunior/GSMVend/gsmvend.htm>, 14 pages.

"About Us," 1 page downloaded from http://www.cellfire.com/about-us/ on May 10, 2007.

(56) References Cited

OTHER PUBLICATIONS

"BCode™ is the future of Mobile Coupon, Ticketing, Loyalty and Payments," 2 page product brochure downloaded from http://www.bcode.com on May 11, 2007.
"BCode™ MediaHub 200 Mobile Coupon, Ticketing Loyalty and Payments," 2 page product brochure.
"Cellfire—Mobile coupons for your cell phone," 1 page product brochure downloaded from http://www.cellfire.com on May 10, 2007.
"Cellfire, Coupons on Cellfire," 2 pages downloaded from http://www.cellfire.com/coupons on May 10, 2007.
Press Release, "Three months after California release, Cellfire™ reports redemption rates n times greater than paper coupons," issued by Cellfire, Inc. Mar. 22, 2006; pp. 1-2 downloaded from http://www.cellfire.com/about-us/articles/2006-03-22_redemption-rate.
Purdy et al., "When Mobile Coupons Replace Paper Coupons, Everyone Wins," pp. 1-17 published by Frost & Sullivan.
International Searching Authority, United States Patent & Trademark Office, International Search Report for International Patent Application No. PCT/US2007/088615, 2 pages. (Date completed: May 27, 2008).
PCT International Search Report, Application Serial No. PCT/US08/50638, dated Apr. 10, 2008, 1 page.
"Diebold Patents Cover Cell Phone Access to ATMs," [online]. Wireless Innovation, Sep. 4, 2007, [Retrieved from the Internet: <URL: http://blog.wirefly.com/wirelessinnovation/09042007/diebold-patents-cover-cell-phone-access-to-atms>, 1 page.
"Beka Ntsanwisi," Mobile Experience Sketchbook, v. 1.0, Apr. 2, 2006, VISA Mobile Innovation & Brian Goldston Inc., 23 pages.
Ondrus, Jan et al.; "A Multi-Stakeholder Mulit-Criteria Assesment Framework of Mobile Payments: An Illustration with the Swiss Public Transportation Industry"; 2006, *Proceedings of the 39th Annual Hawaii International Conference on System Sciences*, 14 pages.
Office Action dated Mar. 1, 2013 in U.S. Appl. No. 11/971,687, 29 pages.
Office Action dated May 22, 2014 in U.S. Appl. No. 11/971,711, 27 pages.
U.S. Appl. No. 08/837,496.
Notice of Allowance in U.S. Appl. No. 11/971,586 dated Dec. 30, 2016, 13 pages.

\* cited by examiner

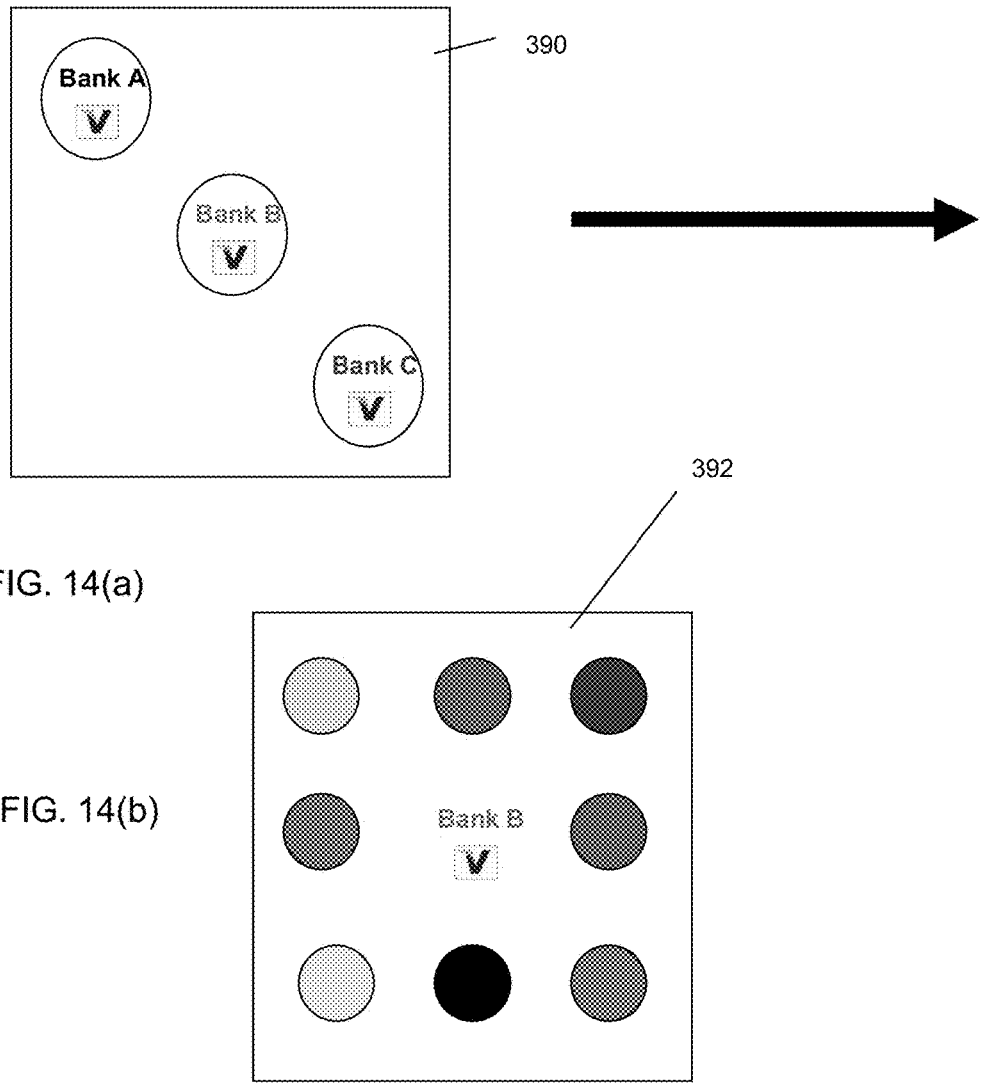
FIG. 14(a)
FIG. 14(b)
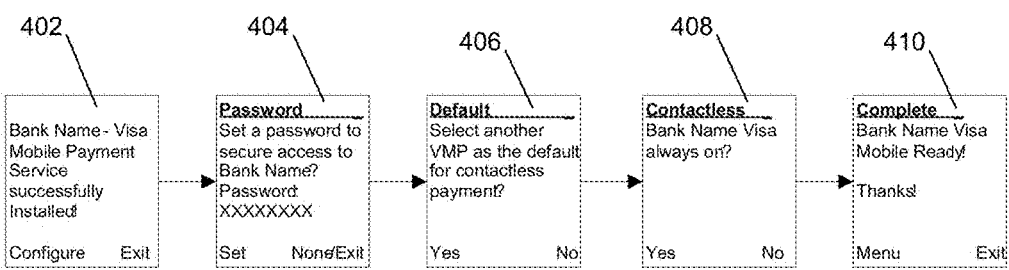
FIG. 15

MOBILE PAYMENT MANAGEMENT

CROSS-REFERENCES TO RELATED APPLICATIONS

This patent application is a continuation of U.S. patent application Ser. No. 11/971,715, filed on Jan. 9, 2008, which is a non-provisional of and claims priority to U.S. provisional patent application No. 60/884,212, filed on Jan. 9, 2007 and U.S. provisional patent application No. 60/884,290, filed on Jan. 10, 2007, of which are all herein incorporated by reference in their entirety for all purposes.

This application is also related to U.S. patent application Ser. No. 11/971,586, filed Jan. 9, 2008, entitled "Mobile Phone Payment With Disabling Feature", U.S. patent application Ser. No. 11/971,711, filed Jan. 9, 2008, entitled "Mobile Phone Payment Process including Threshold Indicator", and U.S. patent application Ser. No. 11/971,687, filed Jan. 9, 2008, entitled "Contactless Transaction". These applications are herein incorporated by reference in their entirety for all purposes.

BACKGROUND

People of all ages around the world use a mobile phone as an essential component of their day. In some parts of the world they are the primary communication device, but mobile phones are more than just communication devices. They are truly multi-functional, providing the consumer with the capability to not only place and receive phone calls but also to take photos, send text messages, listen to music, surf the Web, and even watch movies.

Consumer demand for all-purpose multi-functional mobile phones is increasing. Technology that supports a mobile payments infrastructure is emerging (i.e., contactless payment acceptance infrastructure, NFC-enabled mobile phones, and robust mobile networks). The mobile phone has the potential to enhance the security and convenience of using a payment product as well as introduce payment products to parts of the world that don't currently have a support infrastructure for traditional payment products.

Consumers are interested in mobile payments and better ways to conduct transactions using mobile phones and better ways to manage the payment process are needed.

Also, in some cases, a consumer may have two or more payment cards (e.g., credit cards) and may want to use the account numbers associated with those payment cards using his or her phone. The different issuers for those credit cards may have different payment services that can be provided with those cards. It would be desirable to allow a user to use the different payment services offered by such issuers on a single phone.

Embodiments of the invention address these and other problems individually and collectively.

BRIEF SUMMARY

Embodiments of the invention are directed to improved consumer mobile phone payment systems and methods.

One embodiment of the invention is directed to a method. The method comprises receiving data associated with a plurality of issuer specific payment services at a mobile phone; entering a selection of one of the issuer specific payment services as a default service; and conducting a transaction using the mobile phone using the one selected issuer specific payment service.

Another embodiment of the invention is directed to a computer readable medium comprising code for receiving data associated with a plurality of issuer specific payment services at a mobile phone; code for entering a selection of one of the issuer specific payment services as a default service; and code for conducting a transaction using the mobile phone using the one selected issuer specific payment service.

Another embodiment of the invention is directed to a phone comprising: a processor; a memory operatively coupled to the processor, the memory comprising code for receiving data associated with a plurality of issuer specific payment services at a mobile phone, code for entering a selection of one of the issuer specific payment services as a default service, and code for conducting a transaction using the mobile phone using the one issuer specific payment service; a display operatively coupled to the processor; and an antenna operatively coupled to the processor.

Another embodiment of the invention is directed to a method comprising: sending data associated with a plurality of issuer specific payment services to a mobile phone comprising a contactless element, which is capable of allowing the phone to communicate contactlessly with a contactless reader in a point of sale terminal; and sending a plurality of messages from the plurality of issuers to the mobile phone.

Another embodiment of the invention is directed to a computer readable medium comprising code for sending data associated with a plurality of issuer specific payment services to a mobile phone comprising a contactless element, which is capable of allowing the phone to communicate contactlessly with a contactless reader in a point of sale terminal; and code for sending a plurality of messages from the plurality of issuers to the mobile phone.

These and other embodiments of the invention are described in further detail below.

BRIEF DESCRIPTION OF THE DRAWINGS

FIGS. 14(a) and 14(b) shows screen shots illustrating different issuer specific mobile payment applications that a consumer can select from, and a subsequent screen shot illustrating that a specific mobile payment application has become a default application.

FIG. 15 shows screen shots associated with the selection of an issuer specific mobile payment application as a default application.

DETAILED DESCRIPTION

I. Mobile Transaction Systems

Embodiments of the invention combine payment functions with a range of value-added applications and features, such as coupons, personalization, and account management. Embodiments of the invention make it easy for issuers and mobile operators to offer convenient new services to consumers via mobile phones.

Some features of embodiments of the invention include the following:

Payment for telephone services (either prepaid or postpaid): Embodiments of the invention allow a consumer to pay for phone services using a payment application on the consumer's phone.

Contactless payment at the point of sale: Using embodiments of the invention, consumers can easily and quickly use their phone in lieu of a card for payment at merchant locations.

Remote payment: Using embodiments of the invention, a consumer can use his or her mobile phone to pay for goods and services for any card-not-present type of transaction. To use remote payment, the consumer can register his or her payment account number with a mobile operator and then the mobile operator links the consumer's payment account number to the mobile phone number. Whenever the consumer conducts a card-not-present type of transaction (e.g., mail order, telephone order, or Internet purchase), the consumer can provide his or her registered mobile phone number (rather than his or her payment account details) to make the purchase. Mobile money transfers can also take place remotely, but these transactions are unique because they involve the transfer of funds rather than purchases.

Service providers can supply the system's payment and value-added functions via SMS messages (or other messaging protocol) over a mobile network to the consumer's mobile phone. Examples of payment functions include proximity payment, remote payment, and mobile money transfer. Examples of value-added functions include offers, authentication, and top-up of minutes on the mobile phone.

Figure 1:
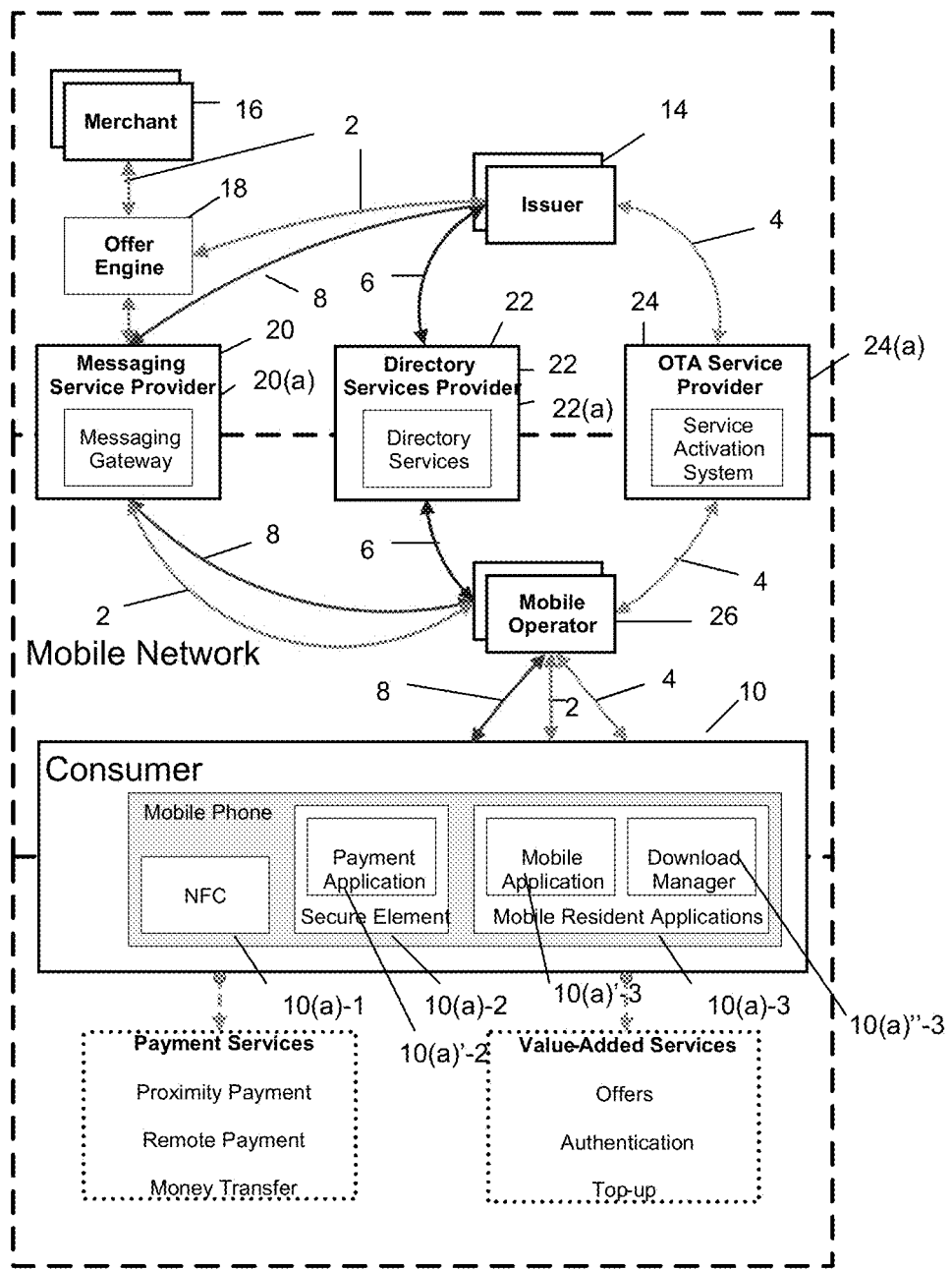
FIG. 1 shows a block diagram of a system according to an embodiment of the invention.

FIG. 1 shows a system according to an embodiment of the invention. Referring to FIG. 1, the participants in embodiments of the invention can include traditional payment services participants such as issuers 14, merchants 16, and consumers 10. Other participants also include a mobile operator 26 and mobile service providers such as a messaging service provider 20, a directory services provider 22, and an OTA (over the air) service provider 24.

The system may also comprise a number of specific components. Examples of such components include an offer engine 18, a messaging gateway 20(a), a directory services engine 22(a), and a service activation system 24(a).

The system may also comprise a mobile phone 10(a), which can include mobile phone components such as an NFC communications element 10(a)-1 (near field communications element; which is an example of a contactless element), a secure element comprising a payment application 10(a)-2, and resident applications 10(a)-3 including one or more mobile applications 10(a)-3' and one or more download managers 10(a)-3".

Messages may pass between the components illustrated in FIG. 1. Reference number 2 shows arrows for offer management messages, reference number 4 shows arrows for service activation messages, reference number 6 shows arrows for directory service messages, and reference number 8 shows arrows for account management messages.

The various components below are described in further detail below.

II. Payment Service Types and Value Added Services

Embodiments of the invention may facilitate at least three types of payment protocols. The first type may include proximity payment (i.e., contactless payment) for face-to-face payments at a merchant's place of business. The second type may include remote payment for payments taking place in an e-commerce environment or other card-not-present situations. The third type may include mobile money transfers (i.e., person-to-person payment) for transferring funds from one person to another for personal, rather than business, use.

Proximity payment offers the same functionality as conventional contactless card transaction processing, but instead of using a contactless card, the consumer presents a mobile phone containing a payment application to a point of sale (POS) device in a merchant's place of business. The NFC-enabled phone emulates a contactless card and uses the same communication standards. The POS device is the same as those used for contactless cards and the payment application interacts with the POS device in the same way a contactless card does. Payment is initiated via a mobile phone rather than a card, but is otherwise identical to contactless transaction processing.

The payment application that is used in a phone 10(a) according to an embodiment of the invention can support at least two different proximity payment configurations. The first configuration is "always-on." When the payment configuration is in always on mode, the default payment application 10(a)-2 is always active so that the consumer can initiate a transaction by waving the phone 10(a) in front of the POS device without having to select the pay function. The second configuration is "manual." When the payment configuration is in manual mode, the consumer 10 can access the payment application 10(a)-2 and select the pay function to make the proximity payment. During this process the consumer 10 can also select the account to use for payment. The issuer 14 can specify which of these configurations, or issuer specific payment service that is associated with the account, is the default and can also specify whether the consumer has the option of choosing a default payment configuration. The proximity payment functionality can be compatible with Visa Contactless Payment Specification (VCPS) 2.0.2. Embodiments of the invention also allow more than one payment application to reside in the secure element and for one of the payment applications to be selected as a default.

Remote payment makes it possible for consumers to use their mobile phone to initiate and authenticate card-not-present transactions between a consumer and a merchant. Remote payments take place over the mobile network and do not involve interacting with a POS device. Remote payment transactions are based on mobile phone numbers instead of account numbers so no financial information is sent over the mobile network. Card-not-present transactions include Internet, call center, and automated services such as interactive voice response (IVR) transactions, as well as face-to-face interactions. Remote payments can use the consumer's registered mobile phone 10(a) as an authentication channel. To use the remote payments function, consumers may register their mobile phone number with a directory service provider 22 or other entity and may link it to an account number so that they can use the registered phone number for payment.

A mobile money transfer refers to a transaction between two individuals. Mobile money transfer allows a cardholder or consumer to transfer money from his or her card or account to another card or account using a mobile phone 10(a). It enables consumers to easily send money to an individual via a mobile phone over the mobile network for international remittances and domestic person-to-person money transfers. Consumers can use mobile money transfer to pay a friend or another individual (who is not a merchant) for services.

Mobile money transfers can rely on aliases instead of account information to transfer funds, so no financial information is sent over the mobile network. Consumers who want to send money can register their account and link it to their mobile phone number. They can also designate the recipients and assign an alias to them. Recipients can register in the service but are not required to do so to receive the funds that are sent to them.

Embodiments of the invention may also provide for a number of value added features including offers, authentication for security purposes, account management, and top-up of mobile phone minutes.

An offer can refer to a coupon, discount, or promotion that an issuer, merchant, or a payment processing organization such as Visa sends to the mobile application on the consumer's mobile phone. The consumer can use the mobile application to redeem the offer.

The offer feature can include at least three elements. The three elements include the offer engine 18 that the merchant 16 or issuer 14 uses to define the offer, the offer message format that ensures delivery to the mobile application (the offer message format can be Visa Mobile Data Format (VMDF)), and the mobile application 10(a) that the offers are sent to. The consumer uses the mobile application 10(a) to manage the offer and to redeem it at a merchant's POS device.

Consumers register (opt-in) with their issuer to receive offers. To send an offer, the merchant or issuer can define the offer and submit it to a payment processing organization such as Visa for review and approval. After the offer is approved, it is entered into the offer engine 18 and is scheduled for delivery to the consumers 10 who have opted-in to receive it. The offer engine 18 formats the offer in a suitable message format and delivers it via SMS or some other mobile channel to the mobile application 10(a)-3 on the consumer's mobile phone 10(a).

The consumer's offers can be delivered to the mobile application 10(a)-3 separate from other messages and can be presented in a defined and branded format. The mobile application 10(a)-3 integrates offer delivery and management with point-of-sale payment. It enables consumers to view, manage, and redeem the offers that they receive. The application 10(a)-3 supports some automated offer management, such as delete on expiry. The offers can include a bar code or promotional code that the merchant scans or enters at the time of purchase. When redeeming offers at a merchant's establishment the consumer can use the mobile phone's proximity payment functionality.

Authentication provides a mechanism for the issuer to request information from the mobile phone that makes it possible for the issuer to confirm that the phone, and the consumer, is indeed what and who they claim to be. It enables all parties in an e-commerce transaction to transmit confidential and correct payment data, and provides authentication that the buyer is an authorized user of a particular account. Both mobile remote payment and mobile money transfer features use payment authentication capabilities.

The top-up feature enables a mobile phone to automate the purchase of minutes on a pre-paid phone. This service is a specific implementation of the remote payment feature. It uses the same mechanism as the remote payments service in that the consumer is purchasing minutes from a mobile operator.

III. Account Management

Account management services include the mobile management of payment account profiles and transactions, ranging from conventional mobile banking to new mobile account management tools. Account management services can be linked to an issuer-specific payment service and can be offered as an extension of the issuer's existing account management services. The mobile payment account management feature can integrate with existing issuer bank systems as well as any future account management service provider, whether it is a bank or another third party.

Each issuer 14 can decide what account management features are available to the consumer. Consumers 10 can use the mobile application 10(a)-3' to request current account balances, receive payment-applied notices and transaction receipts, and configure and receive balance alerts, transaction alerts, and payment reminders. When account management services are available to the consumer 10, the consumer 10 can configure the features to deliver account information based on consumer criteria. For example, the consumer can request to receive an alert when his or her account balance reaches a specified threshold.

The mobile payment system uses messaging to support account management services. The messaging system formats the message and sends it via the mobile operator's network 26. Consumers 10 send messages requesting account management services and the issuer 14 or merchant 16 send messages in response.

The following table lists the account management messages that are sent from the mobile application 10(a)-3' on the consumer's mobile phone 10(a) to the issuer 14 or merchant 16 and from the issuer 14 or merchant 16 to the mobile application 10(a)-3' on the mobile phone 10(a).

| Message | Sent From | To |
| --- | --- | --- |
| Balance alert configuration request | Consumer via mobile application | Issuer |
| Balance inquiry request | | |
| Payment reminder configuration request | | |
| Transaction alert configuration request | | |
| Balance alert configuration response | Issuer | Consumer via mobile application |
| Balance alert | | |
| Balance inquiry response | | |
| Payment applied | | |
| Payment reminder configuration response | | |
| Payment reminder | | |
| Transaction alert configuration response | | |
| Transaction alert | | |
| Transaction failure receipt | Merchant | Consumer via mobile application |
| Transaction success receipt | | |

The issuer 14 is traditionally responsible for acquiring, registering, and supporting consumer payment accounts. In the mobile transaction system, in addition to handling the payment accounts, the issuer 14 also has the option of supporting account management and offer management features. These account management and offer management features may be features of an "issuer-specific payment service." Furthermore, because payment account activation can occur after the consumer 10 has acquired the mobile phone 10(a), the issuer's traditional card issuance processes can migrate to an OTA service activation environment.

The merchant 16 accepts payment with a payment account in both brick-and-mortar and e-commerce settings. The merchant 16 can also use the mobile payment system to issue offers to the mobile customer base, which can range from a targeted subset to the entire set of account holders.

The messaging service provider 20 provides the message interfaces between the consumer's mobile phone 10(a) and the other providers. This provider operates the messaging gateway 20(a) and related systems.

The OTA service provider 24 manages the secure element 10(a)-2 on the mobile device 10(a), including provisioning secure element applications.

The directory services provider 22 supplies support for remote payment and mobile money transfer transactions that use an alias associated with a registered consumer 10 to route to relevant account information.

The consumer 10 uses a mobile phone 10(a) to access the mobile payment and value-added services. The consumer 10 requests the downloading and personalization of any applications onto the mobile phone 10(a).

The mobile operator 26 provides and provisions the mobile network, including the data services needed to support the above-described services. The mobile operator 26 also typically selects the mobile phones that its network supports and the applications that function on these mobile phones. It also sends messages to and receives messages from the mobile phone 10(a).

Messaging enables the interaction between disparate platform participants. Messages support account management, basic offers, and service activation as well as directory services for remote payments and mobile money transfer.

Some embodiments of the invention are directed to using various combinations of messages to manage a consumer's payment accounts. One embodiment of the invention comprises receiving an account balance inquiry response message using a mobile phone. The mobile phone comprises a contactless element that is configured to communicate with a contactless reader in a point of sale terminal. The account balance inquiry response message provides an account balance for an account associated with the mobile phone, the mobile phone being operated by a consumer. The method also includes receiving a transaction alert message using the mobile phone, wherein the transaction alert informs the consumer that a transaction has occurred using the account, and also receiving an offer message, wherein the offer message provides a benefit for the consumer if the consumer uses the mobile phone to a conduct predetermined transaction. Such message may be received by the mobile phone 10(a) and may be displayed by the mobile phone 10(a).

The mobile operator 26 or any other suitable entity may correspondingly send a balance inquiry response message, transaction alert message, and an offer message to the mobile phone. The mobile phone. The mobile operator 26 may operate a communications server comprising a processor, and a computer readable medium operatively coupled to the processor. The computer readable medium can comprise code for sending the various messages to the mobile phone 10(a).

The messaging service provider 20 formats the messages the issuer 14, merchant 16, and other service providers send and delivers them to the mobile application 10(a)-3' on the mobile phone 10 via the mobile network. It also formats and delivers account management messages the consumer 10 sends via the mobile application 10(a)-3' on the mobile phone 10 to the issuer 14 and merchant 16.

The basic protocol followed for messages sent to and from the mobile application 10(a)-3' can be the Visa Mobile Data Format (VMDF). All messages can be in VMDF format by the time they reach the messaging gateway 20(a) to ensure that they are delivered to the mobile application 10(a)-3'. The VMDF is not SMS-specific. It encompasses the use of any text or binary data provided for the application over the network and for local storage purposes.

The messaging service provider 20 operates the messaging gateway 20(a), which supplies a unified message interface between other providers and participants and the consumer's mobile phone 10(a). The messaging gateway 20(a) supports at least three features. The first feature is an alert API which facilitates the transfer of messages both to and from the mobile application 10(a)-3' on the consumer's mobile phone 10(a). The second is a reporting Web interface which allows issuers 14, merchants 16, and a payment processing organization such as Visa to monitor the relevant traffic to and from the consumer's mobile phone applications. The third is a testing hub that is an interface that allows participants to send messages to and receive messages from a virtual mobile application to test the readiness of their systems. The testing hub supports both account management and offer messaging.

The offer engine 18 is the system that is responsible for managing offers. Its capability may range from being a simple user interface (UI) through which merchants 16 can define offers to a sophisticated database marketing system that can target offers to consumers based on a wide range of demographic and behavioral data. In addition, the messaging gateway 20(a) supports an offers Web interface, which acts as the offer engine. It is a basic Web-based UI through which merchants 16 can define simple offers for delivery to all consumers 10.

The process of enabling a mobile phone is called "service activation," because it constitutes activation on the mobile phone. Service activation can be used to provision the payment application 10(a)-2', the mobile application 10(a)-3', a service activation application, account information, and data (such as data relating to an issuer specific payment application) onto the mobile phone. Without service activation, such applications can only be issued if the secure element, and in many cases the mobile phone itself, is personalized before the consumer takes possession of it. While service activation is a general term for this activation that could theoretically take place via multiple channels or means, embodiments of the invention are preferably focused on the over-the-air (OTA) provisioning of the payment application to a secure element 10(a)-2 on a mobile phone 10 via the mobile network. OTA service activation allows the issuer 14 to securely enable the phone 10(a) remotely with secure payment and account data without requiring the consumer to visit its bank or a retail outlet.

The OTA service provider 24 operates and manages the OTA service activation system 24(a). The OTA service activation system 24(a) provides personalization and issuance functionality as well as day-to-day management of the consumer's secure element applications. A feature of the OTA service activation system 24(a) is the provisioning and personalization of the secure element applications using the mobile operator's network. Furthermore, the OTA service provider 24 uses this system 24(a) to manage the secure elements deployed in the field after they are personalized. This is a desirable feature for managing payment accounts. Compromised accounts can be locked and unlocked and the platform can be removed OTA. The OTA service activation system 24(a) provides information to the mobile phone OTA for loading, installing, and personalizing the software on the phone, locking and unlocking the applications on the phone, and removing applications from the phone. It communicates with the download manager 10(a)-3" on the phone to carry out OTA activities.

OTA service activation also provides remote control of mobile phones for corporate branding, offers, and messaging configuration and programming of new services without user intervention. It uses OTA technology to communicate with the SIM or NFC chip without physical access to the phone 10(a). New services can be securely downloaded without operator re-issuance of the mobile phone 10(a).

Directory services are used to support mobile money transfers and remote payments as well as value-added services such as advanced offers (in a future release of the platform), authentication, and top-up. Directory service is desirable for transactions that use an alias associated with a registered consumer to route to other information. It determines who the consumer is and then routes the relevant consumer information to the issuer.

For mobile money transfers, an alias can be used to identify and/or contact the recipient of the money transfer. Typically, the directory allows senders to use an alias that is more convenient or human-friendly (like a mobile number) than an account number. In money transfer transactions, aliases/directories also allow greater privacy between the sender and the recipient. Each party's bank can retain respective personal information belonging to the sender and recipient securely, without the need for the sender and recipient or cardholder and merchant 16 to share any personal information with each other to conduct the transaction.

The mobile phone 10(a) is the conduit between the service providers and the consumer 10. The mobile phone 10(a) includes a number of distinct features. The first feature is NFC (near field communications) radio capability which offers card emulation mode to enable proximity payment. It includes an antenna to communicate with the merchant's contactless POS device. A second feature is a secure element form factor to securely hold the payment application. A third feature is an existing mobile application space with a mobile application 10(a)-3' and a download manager 10(a)-3".

The mobile phone 10(a) can: initiate payment transactions, receive data relating to issuer specific payment services, present the issuer specific payment services to a consumer for selection, receive offers from issuers and merchants and display them; receive account management information from issuers 14 and display it in the mobile application; and communicate with the OTA service activation system 24(a) for OTA activities.

To enable mobile payments, the secure element 10(a)-2 provides the following capabilities. It can provide secure storage to protect sensitive data related to mobile payments. This includes private keys associated with the phone and consumer, public keys, and credentials associated with issuers and back end systems. It can also provide the ability to securely store consumer-specific personal information associated with mobile payments such as a credit/debit card's PAN (personal account number). It can also provide cryptographic functions to support secure payment protocols, data integrity, and confidentiality. This includes support for encryption/decryption, signature verification, and authentication of the secure SMS messages received from the issuer, service activation system, and other back end systems. It can also provide secure deployment and execution environment for the mobile payment application 10(a)-3".

It is understood that although the specific examples described herein include the use of a secure element and a payment application within the secure element, and a mobile application outside of the secure element, embodiments of the invention are not limited to this. For example, the functions of the payment application and the mobile application can be combined into one application in any suitable logical section of hardware in the phone.

The secure element 10(a)-2 can be in one of the following forms: Embedded hardware: This is a tamper-proof hardware smart card with contactless capability that is integrated tightly with the mobile phone. Removable Universal Subscriber Identity Module (USIM): The secure element can be integrated with a USIM card that provides smart card functionality. In this case, the contactless capability is separate. Removable Secure Digital (SD) card: A smart card provides a secure programmable environment. Applications and mobile payments-specific security information are provisioned on the smart card. The communication to the secure element on the smart card uses APDU commands.

The secure element can also provide an integrated NFC capability that supports the ISO 14443 standard. The NFC capability provides support for peer-to-peer, reader/writer, and card emulation modes.

The payment application 10(a)-2' is securely stored on the mobile phone's secure element 10(a)-2 and is used to conduct payment transactions. It may include one of two Java card applications—the Visa Smart Debit/Credit (VSDC) card specification applets integrated with the Proximity Payment System Environment (PPSE). The VSDC application is the payment application; the PPSE application is the directory application that stores the details of the payment application. This is the same application that is used for commercially available Visa payWave contactless payment cards. The VPA currently uses contactless specification VCPS 2.0.2. The current version of the GlobalPlatform applet is version 2.7.

The payment application 10(a)-2 contains both payment functionality and the issuer/cardholder personalization data. The payment application 10(a)-2 is provisioned and personalized on the secure element 10(a)-2 with data the issuer 14 sends OTA through the service activation system 24(a). The service activation system 24(a) channels OTA provisioning, initialization, and personalization commands (based on the issuer's specification) from the service activation system to the payment application 10(a)-2. A personalized instance of payment application 10(a)-2' can be locked, unlocked, and removed from the secure element 10(a) using OTA commands that the issuer 14 initiates through the service activation system 24(a).

To initiate mobile proximity payments, a specific payment application 10(a)-2' (represented by a unique application identifier (AID)) is associated with a specific mobile application 10(a)-3', which links the consumer experience with the mobile proximity mechanism. In addition, the secure element 10(a)-2 can have a specific payment application 10(a)-2' configured as the default for proximity payments.

The payment application 10(a)-2' interfaces with a contactless proximity modem in either manual or automatic mode. When the mobile phone 10(a) comes into proximity of a contactless POS device, the payment application 10(a)-2' is automatically notified if the application is configured in an automatic payment mode. In manual mode, communication with the POS is initiated by the consumer 10 via the mobile application 10(a)-3'.

The mobile application 10(a)-3 includes the user interface. It contains the user interface for payment, account management, offer management and redemption, and setting preferences. The mobile application 10(a)-3 is a J2 ME/MIDP 2.0 application (MIDlet). Mobile Information Device Profile (MIDP) is the specification published for the use of Java on embedded devices such as mobile phones. Each mobile application 10(a)-3 can be customized and configured for a specific issuer and is associated with a specific payment application instance.

The customization and configuration process can include the receipt of data associated with the issuer specific payment application instance, which may be linked to an issuer specific payment service. In embodiments of the invention, there may be many different issuer specific payment application instances linked to different issuer specific payment services. The different issuer specific payment services may have different sets of features. For example, one issuer may provide offer messages, and does not provide transaction alert messages. Another issuer may provide transaction alert messages, but does not provide offer messages. In embodiments of the invention, the consumer 10 may select one issuer specific payment service as a default service for use with his phone 10(a), and then may use the phone 10(a) and the selected issuer specific payment service to conduct transactions such as payment transactions. The issuer specific payment services may include specific management services and payment functions.

The mobile application 10(a)-3' can be OTA provisioned, activated, and configured according to the issuer's specifications on the mobile phone 10(a) during service activation and initialization. Once configured, an application instance appears as an entry in the phone's main menu folder for mobile payments and other financial applications. There can be more than one application instance on the menu based on the number of instances of the mobile application that have been activated, provisioned, and configured on the phone 10(a).

The user interface can include a splash page that welcomes the consumer to the application, a main menu page of all the features the issuer is supporting, payment-related pages, and the detail pages of the features that the issuer is supporting. The issuer 14 can customize certain visual elements of the user interface, such as providing a logo and product name and customizing the splash screen.

The mobile application 10(a)-3' can use APDU commands to interface with the corresponding payment application 10(a)-2' to enable proximity payments and provide a secure storage of credentials associated with mobile payments and the consumer 10.

The download manager 10(a)-3" can be a MIDlet that resides on the mobile phone 10(a) (but not on the secure element 10(a)-2). It is the interface between the service activation system 24(a) and the secure element 10(a)-2. It is responsible for initial provisioning, service activation, initialization, management (including locking and unlocking of the mobile application 10(a)-3'), and configuration of the mobile application 10(a)-3', the secure element 10(a)-2, and the payment application 10(a)-2'. The download manager 10(a)-3" interfaces with the service activation system 24(a) (as part of the backend systems) and local device management and provisioning agent on the mobile phone 10(a) for these functions.

IV. Mobile Payment Processes

A number of exemplary payment processes can be described with reference to FIGS. 2-3.

Figure 2:
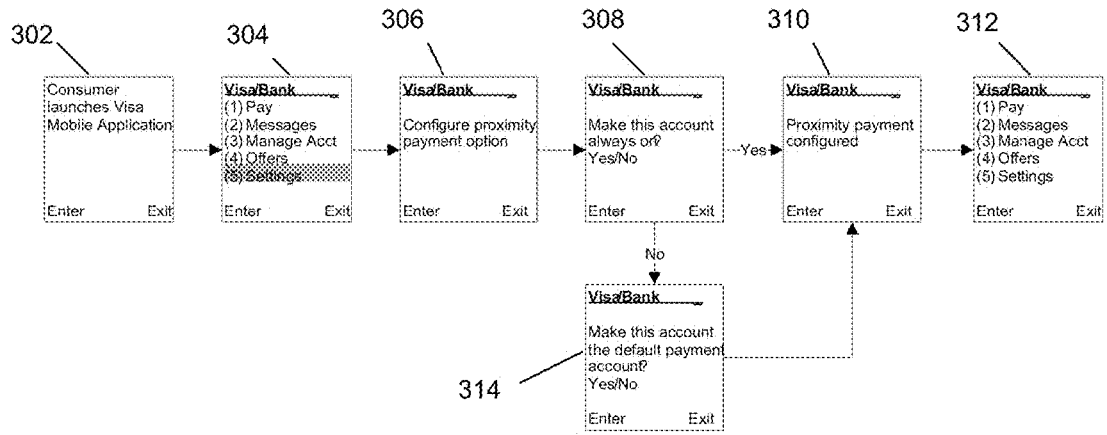
FIG. 2 shows screen shots on a phone display illustrating a configuration process.

Referring to FIG. 2, a consumer can select whether a proximity payment feature is automatic (always on), manual with no password, or manual with a password. If the consumer selects automatic, the consumer needs to specify the default payment account. When in automatic mode the proximity payment feature is always active, and the payment application will perform a proximity payment transaction when the consumer waves the phone over a contactless reader. If either of the manual options is selected, the consumer needs to launch the mobile application and needs to choose the pay function to activate the proximity payment feature.

Referring to FIG. 2, the consumer launches the mobile application 302 and selects the proximity payments settings option 304. The consumer has the option of making the account automatic (always on). If the consumer chooses to make the account always on 306, 308, the mobile application sets the configured AID (unique application identifier) to be the default. If the consumer chooses not to make the account automatic, the consumer then has the option of making the account the default payment account when making a manual payment 314, 310, 312.

Figure 3:
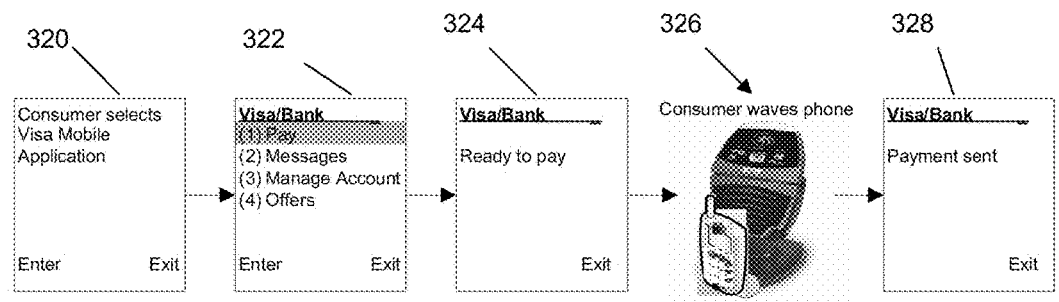
FIG. 3 shows screen shots on a phone illustrating a payment process.

Referring to FIG. 3, to manually activate the proximity payment feature, the consumer selects a pay or ready-to-pay function within the mobile payment application. This enables the secure element to emulate a contactless card and interact with a contactless reader associated with a POS terminal. This mode remains active until a specified time period has elapsed (the timeout). If the timeout period elapses and the consumer has not conducted a proximity payment transaction, the mobile application deactivates the proximity payment function, requiring the consumer to reactivate it to proceed with the transaction.

The consumer selects the mobile application to launch it and selects the payment function 320, 322. The phone displays the "Ready to Pay" page for 30 seconds or until the consumer exits the page or the payment transaction is completed 324. To proceed with the transaction, the consumer places the phone in the vicinity of a contactless reader 326. The reader obtains the account information from the secure element on the phone and completes the transaction. The phone displays a "Payment Sent" page for 15 seconds or until the consumer exits the page. The phone then reverts to its previous state.

V. Specific Account Management Processes

Figure 4:
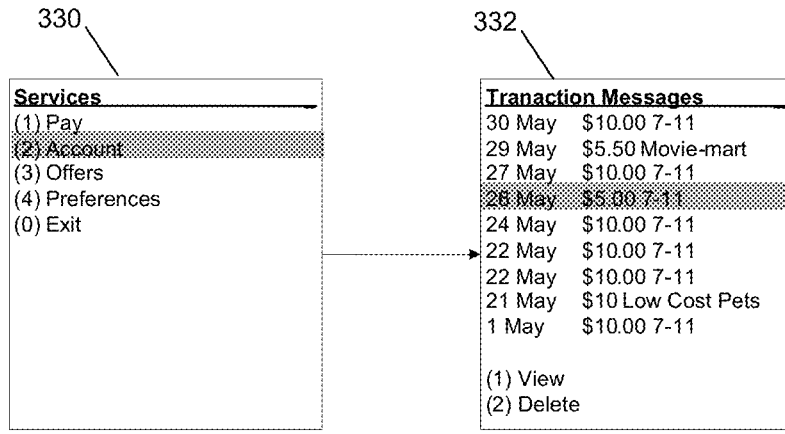
FIGS. 4-6 show various screen shots on a phone display with transaction messages.

Referring to FIG. 4, when a message is a transaction receipt, a transaction alert, or a payment-applied message, it is stored in a transaction message repository in the phone. Other messages, such as balance inquiry, balance alert, and payment reminder messages are not stored in the transaction message repository.

Each item in the message repository can correspond to one particular account management event. These events can be supplied OTA as in the case of most alerts and transaction receipts.

The consumer needs to be in the mobile application to access the transaction message repository. The mobile application's main menu provides an option that the consumer can select to open the repository as shown in screen shot 330. The repository displays a list of transaction receipts, transaction alerts, and payment-applied message summaries as shown in screen shot 332.

Figure 5:
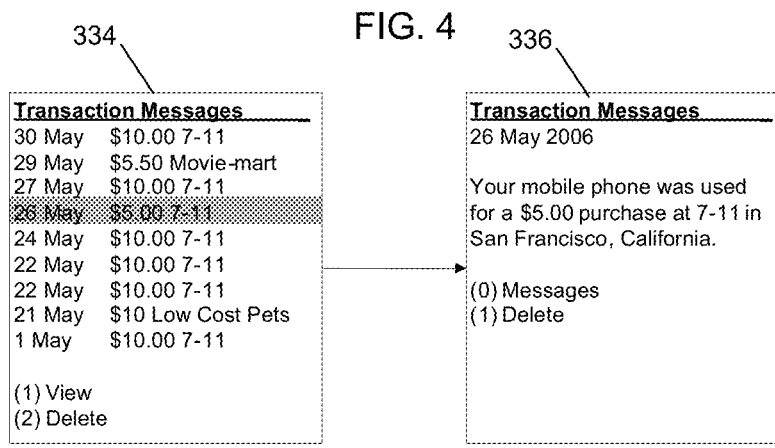

Referring to FIG. 5, as shown by screen shots 334 and 336, the consumer can view the details of transaction receipts, transaction alerts, and payments that have been applied to the account. Specifically, the consumer can view three different types of transaction messages: transaction receipts, transaction alerts, and payment-applied messages. The content can be different for each type of message. The consumer can select the message and then select the view message option, to display the message detail screen.

Figure 6:
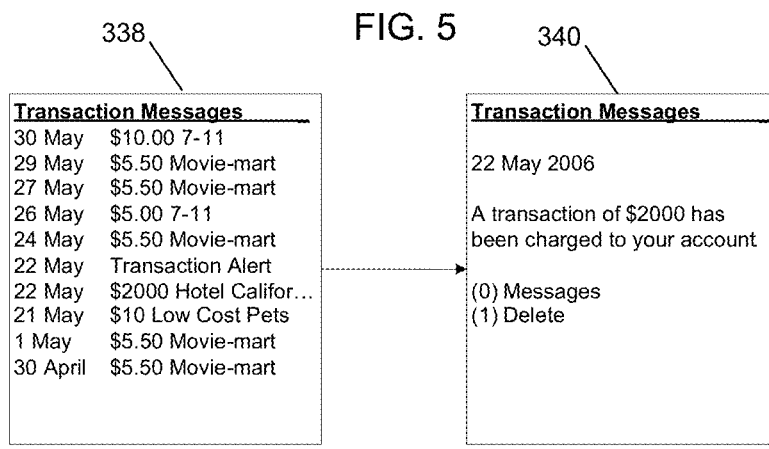

Referring to the screen shots 338 and 340 in FIG. 6, a threshold for a transaction alert can be configured within the mobile application. Alternatively, the alert threshold can be configured on the issuer's Web site. If the threshold is surpassed, then a message such as the one shown in screenshot 340 is shown.

Figure 7:
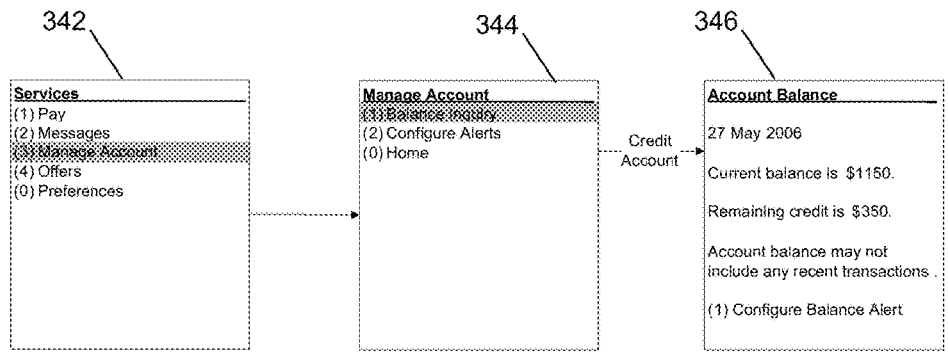
FIGS. 7-8 show various screen shots on a phone display for balance inquiries.

Referring to screen shots 342, 344, and 346 in FIG. 7, the consumer can request the existing balance for the credit product that is stored on the mobile phone's secure element. This is similar to typical remote banking functionality except instead of a Web channel, this is for the mobile phone channel.

After the issuer processes the balance inquiry, the issuer transmits the response message to the balance inquiry to the consumer's mobile phone. The balance inquiry is displayed, and also updated in the account summary feature of the mobile application for future reference. The requested balance information includes (1) the issuer's name, (2) current balance, (3) remaining credit available, and (4) disclaimer about the accuracy of balance information for credit accounts.

Figure 8:
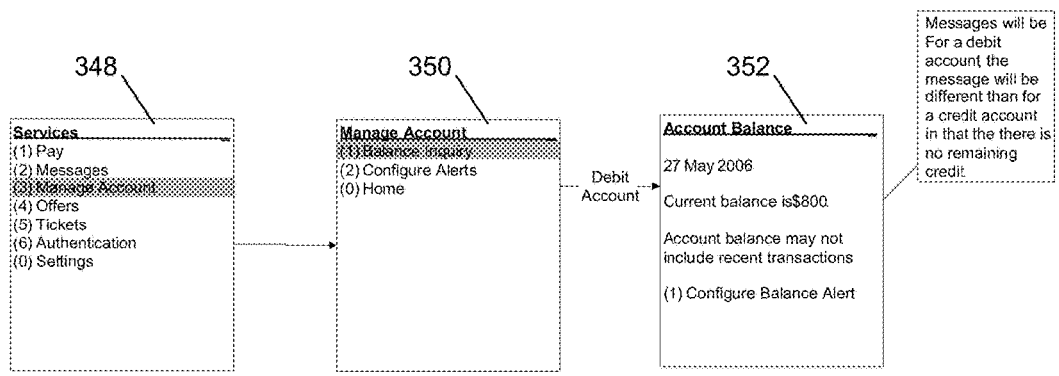

Referring to screen shots 348, 350, and 352 in FIG. 8, the consumer is able to request the existing balance for the debit product that is stored on the mobile phone's secure element. This is similar to a typical remote banking functionality. The balance inquiry is displayed, and also updated in the account summary feature of the mobile application for future reference. The balance information may include (1) the issuer's name, (2) the current balance in debit account, (3) funds available to withdrawal, (4) available balance, and (5) disclaimer about the accuracy of the balance information.

Figure 9A:
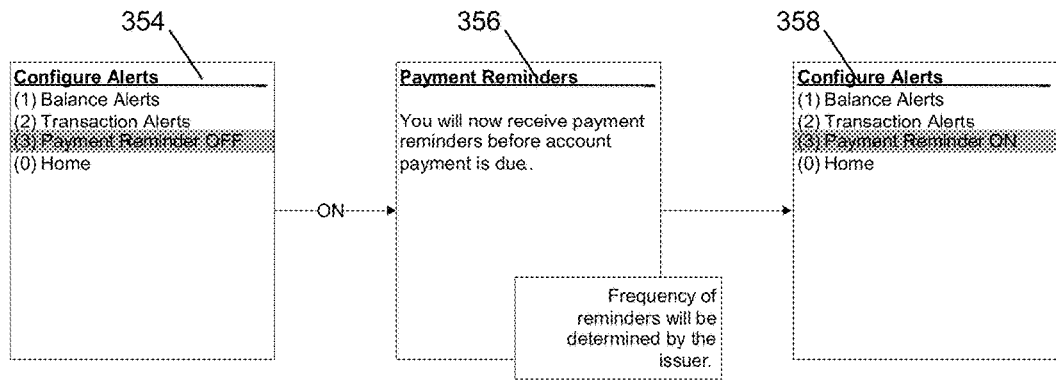
FIGS. 9(a)-9(b) show various screen shots on a phone display for payment reminders.
Figure 9B:
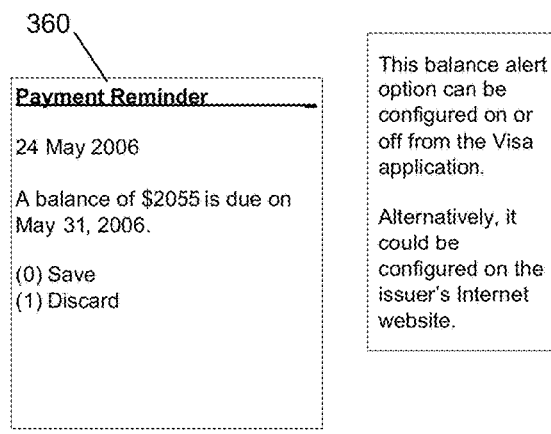

Referring to the screen shots 354, 356, 358, and 360 in FIGS. 9(*a*) and 9(*b*), the consumer can register or unregister for payment reminders using the mobile application. The consumer can configure the current state of the payment reminder feature (ON/OFF).

The consumer does not have to be alerted about whether the configure payment reminder operation with the issuer has been successful. Only the consumer's choices need to be confirmed from within the mobile application at the time these choices are made.

Figure 10:
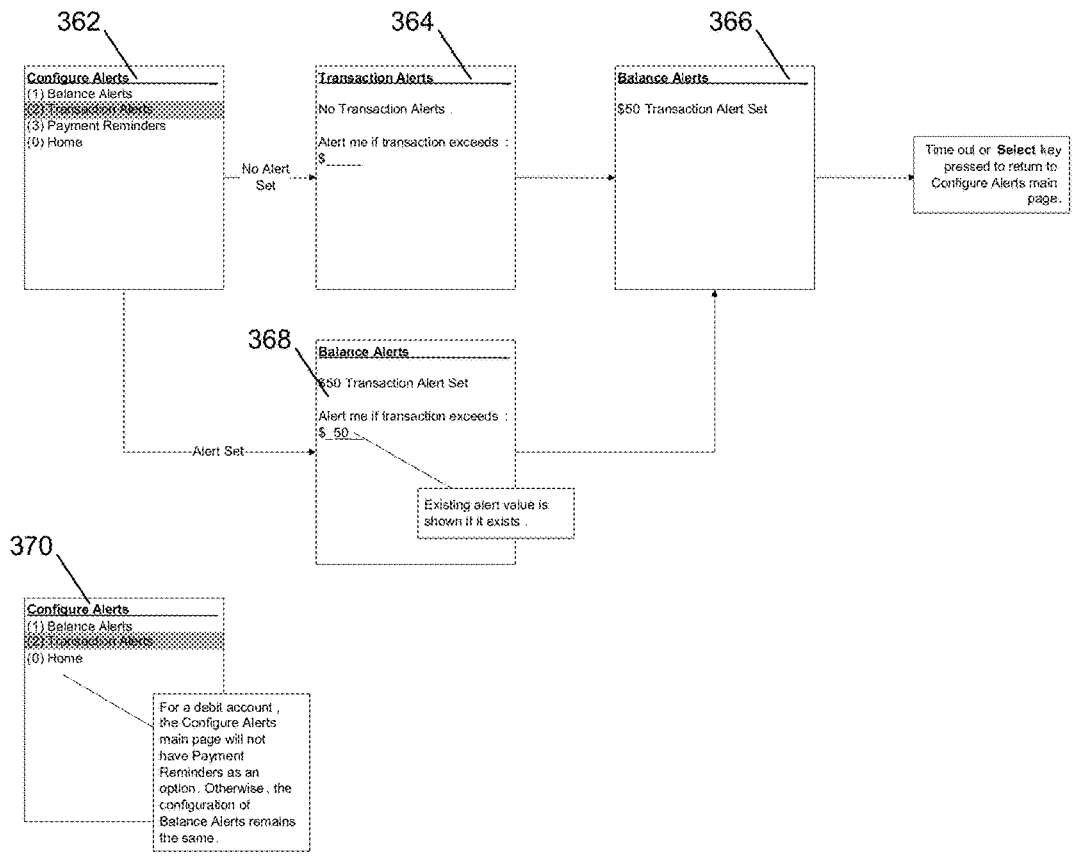
FIGS. 10, 11(a), and 11(b) show screenshots associated with balance alerts.

Referring to the screen shots 362, 364, and 366 in FIG. 10, the consumer is able to configure the balance level at which a balance alert occurs. This use case describes this option for the case where the payment instrument is a credit product. The consumer configures the following: (1) The credit balance at which a balance alert will be generated, and (2) the current state of the balance alert feature (ON/OFF).

The consumer does not have to be alerted about whether the configure balance alert operation with the issuer has been successful. Only the consumer's choices need to be confirmed from within the mobile application at the time these choices are made.

Figures 11A, 11B:
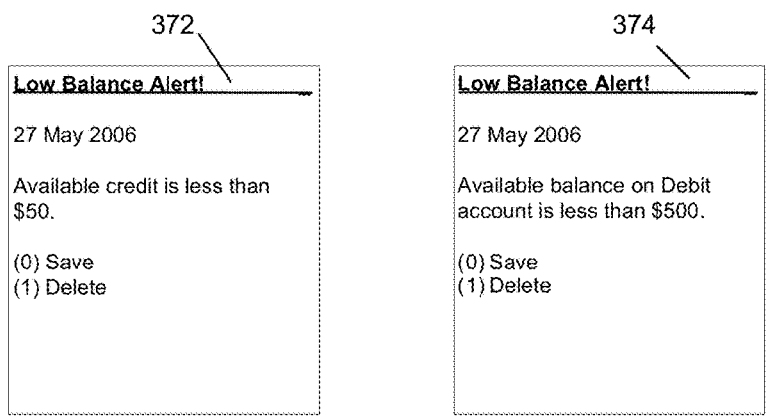

Referring to the screen shot 372 in FIG. 11(*a*), the consumer receives a balance alert for a credit product when a predefined threshold has been exceeded. The issuer generates this alert and it is sent to the consumer's handset.

Referring to the screen shot 374 in FIG. 11(*b*), the consumer receives a balance alert for a debit product when a predefined threshold has been exceeded. The issuer generates this alert and it is sent to the consumer's handset.

Figure 12:
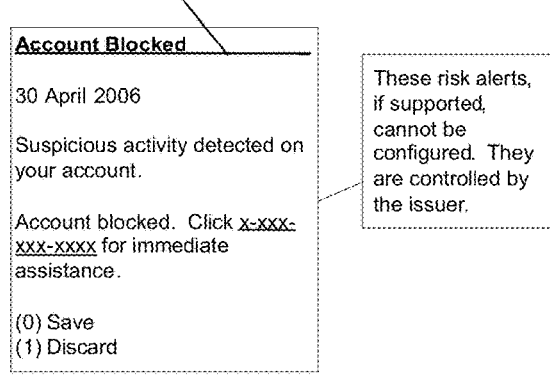
FIG. 12 shows a screen shot indicating that an account is blocked due to suspicious activity.

Referring to the screen shot 376 in FIG. 12, the consumer receives an issuer generated risk alert when their payment account has been blocked because of reasons specific to the issuer. The issuer generates this alert and it is sent to the consumer's phone.

Regardless of whether a platform password is configured, the mobile application is launched and the message is displayed to the consumer. Once the message is displayed, the consumer will not be given an option except to acknowledge the message, which exits the application. The message is never stored in some embodiments.

Figure 13:
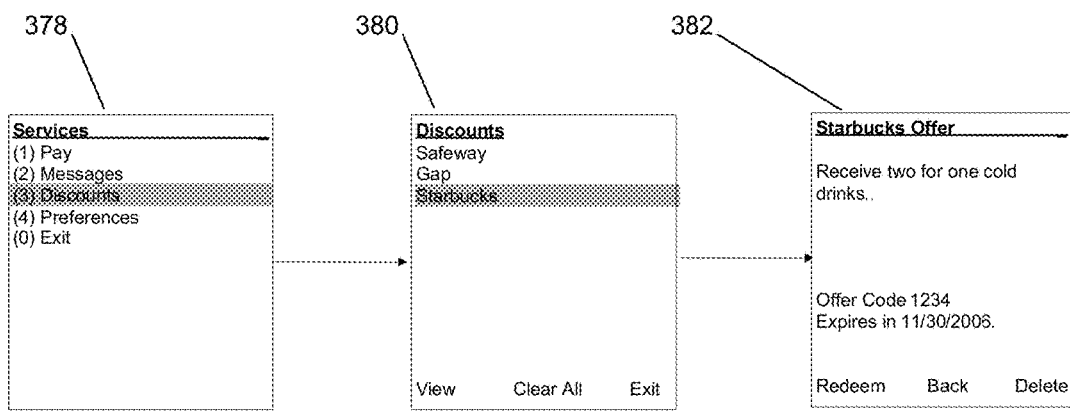
FIG. 13 shows screen shots illustrating discounts.

Embodiments of the invention can also include offers as shown by the screen shots 378, 380, and 382 in FIG. 13. First, an offer repository on the phone can be selected as shown in screen shot 378, and the offer repository is opened and offers are checked for expiry. As shown in screen shot 380, different merchants offering different offers can be displayed. The consumer may select one of them and the merchant's specific offer can be displayed. The consumer may thereafter redeem the offer in any number of ways including using the previously described NFC element or contactless element to communicate with a POS terminal.

VI. Multiple Issuer Specific Payment Service Capability

As noted above, the customization and configuration process can include the receipt of data associated with the issuer specific payment application instance, which may be linked to an issuer specific payment service. The data may include computer code for an issuer specific application, code for an issuer specific instance, or code for a link an issuer specific application or instance. For example, in some embodiments of the invention, there may be many different issuer specific payment application instances linked to different issuer specific payment services. The different issuer specific payment services may have different sets of features. For example, one issuer may provide offer messages, and does not provide transaction alert messages. Another issuer may provide transaction alert messages, but does not provide offer messages. In embodiments of the invention, the consumer 10 may select one issuer specific payment service as a default service for use with his phone 10(*a*), and then may use the phone 10(*a*) and the selected issuer specific payment service to conduct transactions such as payment transactions. The issuer specific payment services may include specific management or value added services and payment functions.

In some embodiments, once loaded to the device, if not more than one instance exists on the device, then that instance can be the default instance. In other embodiments, multiple payment applications specifically associated with different issuers can be present on the mobile phone. The consumer can select from different issuer specific payment applications as shown in FIG. 14(*a*) (applications for Bank A, Bank B and Bank C in window 390). Once a payment application is selected (e.g., Bank B in window 392), it can be set as the default payment application as shown in FIG. 14(*b*).

Referring to the screen shots 402, 404, 406, 408, 410 in FIG. 15, from a usability standpoint, this process strives to achieve the desired result with minimal interaction required from the consumer. It is at the discretion of the issuer to allow consumer configuration and to what level. The consumer interaction is preferably consistent.

Also from a usability standpoint, it is possible that the issuer will not allow the consumer any configuration options. For example, the issuer could configure the platform to be automatically enabled (always on) with free access (that is, no password required). It is also possible that the issuer only allows the consumer to change certain configuration options. For example, the issuer could configure the platform to be manually enabled with mandatory password protected access in which case the consumer would only be prompted to enter a password. In both of the above cases the consumer is always allowed the option to set the platform as the default for proximity.

VII. Computer Apparatuses and Mobile Phones

Figure 16:
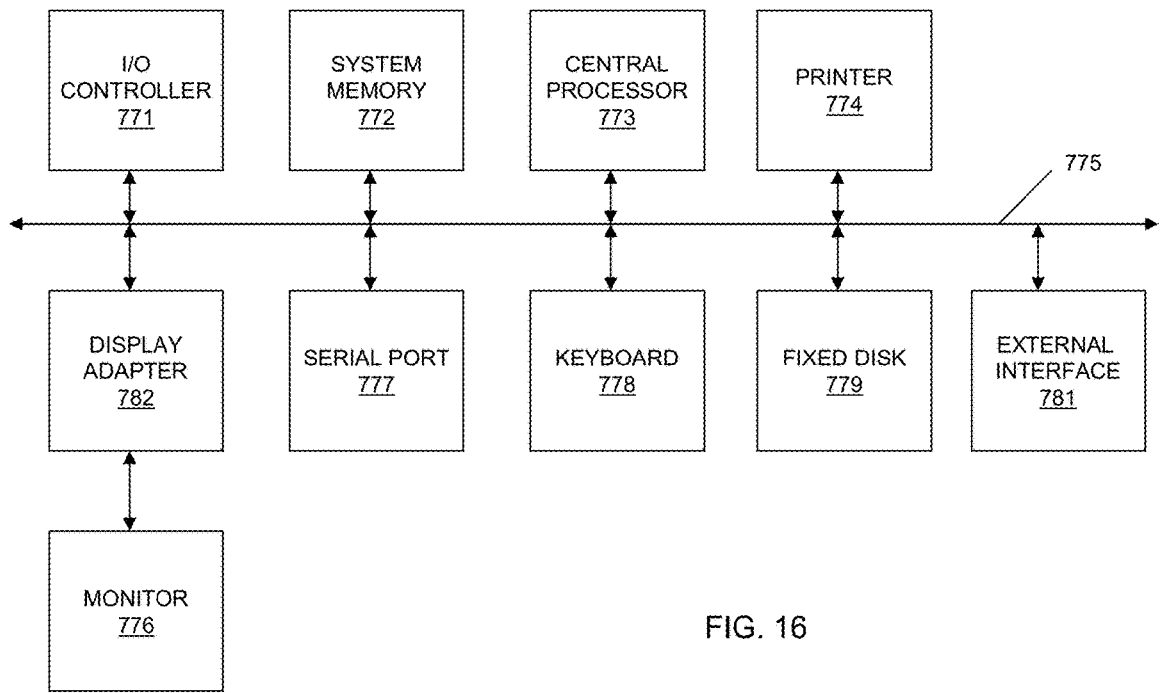
FIG. 16 shows a block diagram of a computer apparatus.

The various participants and elements in FIG. 1 may operate one or more computer apparatuses to facilitate the functions described herein. Any of the elements in FIG. 1 including the offer engine 18, the messaging gateway 20(a), the issuer 14, the directory services engine 22(a), the service activation system 24(a), and the mobile operator 26 may use any suitable number of subsystems to facilitate the functions described herein. Examples of such subsystems or components are shown in FIG. 16. The subsystems shown in FIG. 16 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Figure 17:
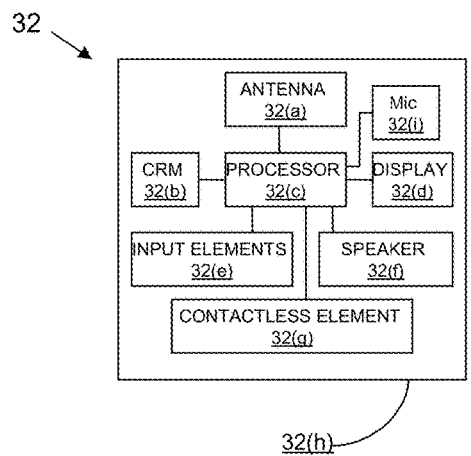
FIG. 17 shows a block diagram of a mobile phone with a contactless element.

FIG. 17 shows a block diagram of another phone 32 that can be used in embodiments of the invention. Such features can be combined with the features shown in the phone 10(a) in FIG. 1. The exemplary wireless phone 32 may comprise a computer readable medium and a body as shown in FIG. 17. The computer readable medium 32(b) may be present within the body 32(h), or may be detachable from it. The body 32(h) may be in the form a plastic substrate, housing, or other structure. The computer readable medium 32(b) may be a memory that stores data (e.g., data relating to issuer specific payment services) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the phone 32.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The phone 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) phone 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32 and an interrogation device. Thus, the phone 32 is capable of communicating and transferring data and/or control instructions via both cellular network and near field communications capability.

The phone 32 may also include a processor 32(c) (e.g., a microprocessor) for processing the functions of the phone 32 and a display 32(d) to allow a consumer to see phone numbers and other information and messages. The phone 32 may further include input elements 32(e) to allow a consumer to input information into the device, a speaker 32(f) to allow the consumer to hear voice communication, music, etc., and a microphone 32(i) to allow the consumer to transmit her voice through the phone 32. The phone 32 may also include an antenna 32(a) for wireless data transfer (e.g., data transmission).

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:

provisioning, by an over-the-air (OTA) service provider computer to a secure element of a mobile phone, issuer specifications for OTA service activation of a plurality of issuer specific payment applications by sending data, associated with the plurality of issuer specific payment applications associated with a plurality of issuer specific payment services provided by a plurality of issuers, to a mobile phone comprising a contactless element, which is capable of allowing the mobile phone to communicate contactlessly with a contactless reader in a point of sale terminal;

provisioning, by the over-the-air (OTA) service provider computer to a transaction message repository of an issuer specific mobile application on the mobile phone, an account management event, wherein the mobile phone comprises the secure element storing the plurality of issuer specific payment applications, and a plurality of issuer specific mobile applications stored outside of the secure element, wherein the plurality of issuer specific payment applications stored on the secure element and the plurality of issuer specific mobile applications stored outside of the secure element are linked with unique application identifiers, wherein the secure element is managed by the OTA service provider and comprises hardware configured to securely store the plurality of issuer specific payment applications and balance information for at least one of the plurality of issuer specific payment applications linked to at least one of the issuer specific payment applications, wherein a unique application identifier is unique to a first issuer specific payment application of the plurality of issuer specific payment applications and a first issuer specific mobile application of the plurality of issuer specific payment applications that is linked to the first issuer specified payment application so that the issuer specific mobile application stored in the secure element is used with the first issuer specific payment application in order to conduct a transaction; and sending a plurality of messages from the plurality of issuers to the plurality of issuer specific mobile applications on the mobile phone, wherein the plurality of messages are formatted and supplied by a messaging service provider to the plurality of issuers, and wherein the messaging service provider is configured to provide at least one of an alert application programming interface, a reporting web interface and a testing hub.

2. The method of claim 1 wherein sending the data associated with the plurality of issuer specific payment applications and sending the plurality of messages are conducted by a mobile operator.

3. The method of claim 1 wherein the messages in the plurality of messages pass through a messaging gateway.

4. The method of claim 1 wherein the plurality of messages comprise two or more of a balance alert configuration response message, a balance alert message, a balance inquiry response message, a payment applied message, a payment reminder configuration response message, a payment reminder message, a transaction alert configuration response message, or a transaction alert message.

5. The method of claim 1 further comprising, formatting the plurality of messages prior to sending the plurality of messages.

6. The method of claim 1 wherein the messages are SMS messages.

7. The method of claim 1 wherein the issuer specific payment applications respectively perform different sets of issuer specific services.

8. The method of claim 1 wherein the mobile phone is able to communicate via near field communications (NFC) with the contactless reader in the point of sale terminal.

9. The method of claim 1 wherein the mobile phone is able to communicate via near field communications (NFC) with the contactless reader in the point of sale terminal to conduct a payment transaction with the point of sale terminal, the point of sale terminal being at a merchant.

10. The method of claim 1 further comprising:

conducting a payment transaction at the point of sale terminal with the mobile phone using near field communications (NFC).

11. The method of claim 1, wherein the secure element comprises one of embedded hardware, a removable universal subscriber identity module (USIM), and a removable secure digital (SD) card.

12. The method of claim 1, wherein an offer message, comprising one of a coupon, a discount, or a promotion selected by a user, is received and stored in an offer repository of the mobile phone.

13. The method of claim 1, wherein the plurality of issuer specific mobile applications stored outside of the secure element are configured to register payment reminders.

14. The method according to claim 1, wherein the over-the-air (OTA) service provider computer is further configured to perform at least one of loading, installing, personalizing, locking, unlocking and removing one or more of the plurality of issuer specific payment applications on the secure element.

15. The method according to claim 1, further comprising:

receiving an offer message, comprising one of a coupon, a discount, or a promotion selected by a user;

storing the offer message in an offer repository of the mobile phone; and in response to expiry of the coupon, the discount, or the promotion, deleting the coupon, the discount, or the promotion from the offer repository of the mobile phone.

16. A server computer comprising:

a processor; and a computer readable medium coupled to the processor, wherein the computer readable medium comprises code executable by the processor to implement a method comprising:

provisioning, by an over-the-air (OTA) service provider computer to a secure element of a mobile phone, issuer specifications for OTA service activation of a plurality of issuer specific payment applications by sending data associated with the plurality of issuer specific payment applications associated with a plurality of issuer specific payment services provided by a plurality of issuers to a mobile phone comprising a contactless element, which is capable of allowing the mobile phone to communicate contactlessly with a contactless reader in a point of sale terminal;

provisioning, by the over-the-air (OTA) service provider computer to a transaction message repository of an issuer specific mobile application on the mobile phone, an account management event, wherein the mobile phone comprises the secure element storing the plurality of issuer specific payment applications, and a plurality of issuer specific mobile applications stored outside of the secure element, wherein the plurality of issuer specific payment applications stored on the secure element and the plurality of issuer specific mobile applications stored outside of the secure element are linked with unique application identifiers, wherein the secure element is managed by the OTA service provider and comprises hardware configured to securely store the plurality of issuer specific payment applications and balance information for at least one of the plurality of issuer specific payment applications linked to at least one of the issuer specific payment applications, wherein a unique application identifier is unique to a first issuer specific payment application of the plurality of issuer specific payment applications and a first issuer specific mobile application of the plurality of issuer specific payment applications that is linked to the first issuer specified payment application so that the issuer specific mobile application stored in the secure element is used with the first issuer specific payment application in order to conduct a transaction; and sending a plurality of messages from the plurality of issuers to the plurality of issuer specific mobile applications on the mobile phone, wherein the plurality of messages are formatted and supplied by a messaging service provider to the plurality of issuers, and wherein the messaging service provider is configured to provide at least one of an alert application programming interface, a reporting web interface and a testing hub.

17. The server computer of claim 16 wherein the plurality of messages comprise two or more of a balance alert configuration response message, a balance alert message, a balance inquiry response message, a payment applied message, a payment reminder configuration response message, a payment reminder message, a transaction alert configuration response message, or a transaction alert message.

18. A system comprising:
a first server computer comprising a first processor and a first computer readable medium comprising code, executable by the first processor to format a plurality of messages from a plurality of issuers; and
a second server computer coupled to the first server computer, wherein the second server computer is an over-the-air (OTA) service provider computer, the second server computer comprising a second processor, and a second computer readable medium coupled to the second processor, wherein the second computer readable medium comprises code executable by the second processor to implement a method comprising:
provisioning to a secure element of a mobile phone issuer specifications for OTA service activation of a plurality of issuer specific payment applications by sending data associated with the plurality of issuer specific payment applications associated with a plurality of issuer specific payment services to a mobile phone comprising a contactless element, which is capable of allowing the mobile phone to communicate contactlessly with a contactless reader in a point of sale terminal;

provisioning, by the over-the-air (OTA) service provider computer to a transaction message repository of an issuer specific mobile application on the mobile phone, an account management event, wherein the mobile phone comprises the secure element storing the plurality of issuer specific payment applications, and a plurality of issuer specific mobile applications stored outside of the secure element, wherein the plurality of issuer specific payment applications stored on the secure element and the plurality of issuer specific mobile applications stored outside of the secure element are linked with unique application identifiers, wherein the secure element is managed by the OTA service provider and comprises hardware configured to securely store the plurality of issuer specific payment applications and balance information for at least one of the plurality of issuer specific payment applications linked to at least one of the issuer specific mobile applications, wherein a unique application identifier is unique to a first issuer specific payment application of the plurality of issuer specific payment applications and a first issuer specific mobile application of the plurality of issuer specific payment applications that is linked to the first issuer specified payment application so that the issuer specific mobile application stored in the secure element is used with the first issuer specific payment application when conducting a transaction; and sending the plurality of messages from the plurality of issuers to the plurality of issuer specific mobile applications on the mobile phone, wherein the plurality of messages are formatted and supplied by a messaging service provider to the plurality of issuers, and wherein the messaging service provider is configured to provide at least one of an alert application programming interface, a reporting web interface and a testing hub.

19. The system of claim 18 wherein the first server computer is operated by a messaging service provider and the second server computer is operated by a mobile network operator.

20. The system of claim 18 wherein the plurality of messages comprise two or more of a balance alert configuration response message, a balance alert message, a balance inquiry response message, a payment applied message, a payment reminder configuration response message, a payment reminder message, a transaction alert configuration response message, or a transaction alert message.

21. The system of claim 18 further comprising:
the mobile phone in communication with the second server computer.

* * * * *

UNITED STATES PATENT AND TRADEMARK OFFICE
CERTIFICATE OF CORRECTION

PATENT NO. : 10,387,868 B2  
APPLICATION NO. : 14/543608  
DATED : August 20, 2019  
INVENTOR(S) : David Wentker et al.

Page 1 of 1

It is certified that error appears in the above-identified patent and that said Letters Patent is hereby corrected as shown below:

In the Claims

Column 17, Claim 1, Line 10 please remove "to a mobile phone comprising a contactless" and insert -- to the mobile phone comprising a contactless --

Column 18, Claim 16, Line 57 please remove "to a mobile phone comprising a contactless" and insert -- to the mobile phone comprising a contactless --

Column 19, Claim 18, Line 56 please remove "payment services to a mobile phone comprising a" and insert -- payment services to the mobile phone comprising a --

Column 20, Claim 19, Line 42 please remove "computer is operated by a messaging service provider and" and insert -- computer is operated by the messaging service provider and --

Signed and Sealed this  
Twenty-fifth Day of February, 2020

Andrei Iancu  
*Director of the United States Patent and Trademark Office*